United States Patent
Hou et al.

(10) Patent No.: US 12,470,966 B2
(45) Date of Patent: Nov. 11, 2025

(54) ELECTRONIC DEVICE, METHOD, AND STORAGE MEDIUM FOR WIRELESS COMMUNICATION SYSTEM

(71) Applicant: Sony Group Corporation, Tokyo (JP)

(72) Inventors: Yanzhao Hou, Beijing (CN); Xiaofeng Tao, Beijing (CN); Chengrui Wang, Beijing (CN); Yang Wen, Beijing (CN); Min Zhu, Beijing (CN); Xiaoxue Wang, Beijing (CN); Min Liu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 470 days.

(21) Appl. No.: 18/013,910

(22) PCT Filed: Jul. 19, 2021

(86) PCT No.: PCT/CN2021/107000
§ 371 (c)(1),
(2) Date: Dec. 30, 2022

(87) PCT Pub. No.: WO2022/017303
PCT Pub. Date: Jan. 27, 2022

(65) Prior Publication Data
US 2023/0292164 A1    Sep. 14, 2023

(30) Foreign Application Priority Data

Jul. 21, 2020  (CN) .......................... 202010704294.1

(51) Int. Cl.
*H04W 24/10* (2009.01)
*H04W 72/54* (2023.01)
(52) U.S. Cl.
CPC ........... *H04W 24/10* (2013.01); *H04W 72/54* (2023.01)

(58) Field of Classification Search
None
See application file for complete search history.

(56) References Cited

U.S. PATENT DOCUMENTS

2012/0115541 A1* 5/2012 Suga ..................... H04W 36/22
455/525
2017/0346525 A1* 11/2017 Stirling-Gallacher ......................
H04W 16/28
(Continued)

FOREIGN PATENT DOCUMENTS

CN    110972244 A    4/2020
CN    110996294 A    4/2020
(Continued)

OTHER PUBLICATIONS

International Search Report and Written Opinion mailed on Oct. 27, 2021, received for PCT Application PCT/CN2021/107000, filed on Jul. 19, 2021, 8 pages including English Translation.

*Primary Examiner* — Nicholas Sloms
(74) *Attorney, Agent, or Firm* — XSENSUS LLP

(57) ABSTRACT

The present disclosure relates to an electronic device, a method, and a storage medium for a wireless communication system. Various embodiments of mobility management for multiple transmission and reception points (multi-TRP) are described. In an embodiment, an electronic device for a first TRP includes a processing circuit, where the processing circuit is configured to: in response to that the first TRP and the second TRP are a master TRP and a secondary TRP respectively serving a terminal device, provide measurement configuration information to the terminal device, receive a measurement report from the terminal device, and update TRPs serving the particular terminal device based at least on measurement quality of the first TRP and the second TRP.

8 Claims, 18 Drawing Sheets

(56) References Cited

U.S. PATENT DOCUMENTS

| | | | |
|---|---|---|---|
| 2018/0020487 A1* | 1/2018 | Tsai | H04W 74/0841 |
| 2018/0279406 A1* | 9/2018 | Agarwal | H04W 72/23 |
| 2019/0132778 A1* | 5/2019 | Park | H04W 16/28 |
| 2019/0149197 A1* | 5/2019 | Byun | H04B 7/0628 375/262 |
| 2019/0260424 A1* | 8/2019 | Byun | H04L 27/26 |
| 2019/0380064 A1* | 12/2019 | Salem | H04W 74/0808 |
| 2020/0053752 A1* | 2/2020 | Huang | H04W 72/23 |
| 2020/0252847 A1* | 8/2020 | Park | H04W 76/27 |
| 2020/0305037 A1* | 9/2020 | Zou | H04W 36/324 |
| 2020/0305038 A1* | 9/2020 | Tooher | H04W 36/0005 |
| 2021/0084655 A1* | 3/2021 | Estevez | H04B 7/0626 |
| 2021/0409127 A1* | 12/2021 | Kim | H04J 11/00 |
| 2022/0240250 A1* | 7/2022 | Li | H04L 5/0023 |
| 2022/0264383 A1* | 8/2022 | Teyeb | H04W 36/0058 |

FOREIGN PATENT DOCUMENTS

| | | |
|---|---|---|
| CN | 110999142 A | 4/2020 |
| CN | 111165015 A | 5/2020 |
| WO | 2017/173037 A1 | 10/2017 |

\* cited by examiner

| C0 | C1 | Serving cell ID | BWP ID |

FIG. 9A

| Serving cell ID | CORESET ID |
| CORESET ID | TCI state ID |

```
┌─────────────────────────────────────┐
│  Provide measurement configuration  │  1005
│  information to a terminal device   │
└─────────────────────────────────────┘
                  │
                  ▼
┌─────────────────────────────────────┐
│  Receive a measurement report from  │  1010
│         the terminal device         │
└─────────────────────────────────────┘
                  │
                  ▼
┌─────────────────────────────────────┐
│   Update TRP(s) serving a particular│  1015
│           terminal device           │
└─────────────────────────────────────┘
```

| Provide to a first TRP with measurement configuration information for a terminal device | 1105 |

↓

| Receive a first update request message from the first TRP | 1110 |

| Perform measurements on a first TRP and a second TRP | 1155 |

↓

| Send a measurement report to the first TRP based on a relative relationship between measured qualities of the first and second TRPs meets a first threshold | 1160 |

FIG. 11B

ELECTRONIC DEVICE, METHOD, AND STORAGE MEDIUM FOR WIRELESS COMMUNICATION SYSTEM

CROSS-REFERENCE TO RELATED APPLICATIONS

This application is based on PCT filing PCT/CN2021/107000, filed on Jul. 19, 2021, which claims priority to Chinese Patent Application No. 202010704294.1, filed on Jul. 21, 2020 and entitled "ELECTRONIC DEVICE, METHOD, AND STORAGE MEDIUM FOR WIRELESS COMMUNICATION SYSTEM", the entire contents of each are incorporated herein by reference.

TECHNICAL FIELD

The present disclosure generally relates to a wireless communication system and method, and in particular, to a mobility management technology for Multiple Transmission and Reception Points (multi-TRP).

BACKGROUND

The development and application of wireless communication technologies has unprecedentedly satisfied people's voice and data communication needs. To improve performance of wireless communication, technologies are constantly introduced to wireless communication systems at different levels. Wireless communication systems that have been or are being developed, such as New Radio (NR), will support mass connectivity, high capacity, ultra reliability, and low latency. A multiple transmission and reception multi-TRP technology is critical for improving communication reliability, coverage, and network capacity through flexible network deployment.

In a multi-TRP network deployment, a single terminal device can be connected to multiple TRPs. In this regard, improvement on a mobility management solution is promising, which ensures quality and reliability of communication between a terminal device and multiple TRPs.

SUMMARY

A first aspect of the present disclosure relates to an electronic device for a first transmission and reception point (TRP), where the first TRP and a second TRP jointly serve a particular terminal device. The electronic device includes a processing circuit, and the processing circuit is configured to: in response to that the first TRP and the second TRP are a master TRP and a secondary TRP respectively serving the terminal device, provide measurement configuration information to a terminal device, where the measurement configuration information specifies at least the first TRP and the second TRP are to be measured; receive a measurement report from the terminal device, where the measurement report comprises measurement qualities of at least the first TRP and the second TRP; and update TRPs serving the particular terminal device based at least on measurement qualities of the first TRP and the second TRP. In an embodiment, updating TRPs serving the particular terminal device includes determining that the second TRP is to become the master TRP serving the terminal device based on that a relative relationship between the measurement qualities of the first TRP and the second TRP meets a first threshold.

A second aspect of the present disclosure relates to an electronic device for a base station, where the base station controls multiple transmission and reception points (TRPs) to jointly serve a particular terminal device. The electronic device includes a processing circuit, and the processing circuit is configured to: in response to that a first TRP and a second TRP are a master TRP and a secondary TRP respectively serving the terminal device, provide to the first TRP with measurement configuration information for the terminal device, where the measurement configuration information specifies that the terminal device performs measurement on at least the first TRP and the second TRP; and receive a first update request message from the first TRP, where the first update request message indicates that the second TRP is to become the master TRP serving the terminal device and the first TRP is to become the secondary TRP serving the terminal device.

A third aspect of the present disclosure relates to an electronic device for a terminal device, where the terminal device is served by a first TRP and a second TRP jointly, and the first TRP is a master TRP and the second TRP is a secondary TRP. The electronic device includes a processing circuit, and the processing circuit is configured to: measure the first TRP and the second TRP based on measurement configuration information received from the first TRP; and send a measurement report to the first TRP based on that a relative relationship between measurement qualities of the first TRP and the second TRP meets a first threshold, where the measurement report comprises measurement qualities of at least the first TRP and the second TRP.

A fourth aspect of the present disclosure relates to a method for a first transmission and reception point (TRP), where the first TRP and a second TRP jointly serve a particular terminal device. The method includes: in response to that the first TRP and the second TRP are a master TRP and a secondary TRP respectively serving the terminal device, providing measurement configuration information to the terminal device, where the measurement configuration information specifies at least the first TRP and the second TRP are to be measured; receiving a measurement report from the terminal device, where the measurement report comprises measurement qualities of at least the first TRP and the second TRP; and updating TRPs serving the particular terminal device based at least on measurement qualities of the first TRP and the second TRP. In an embodiment, updating TRPs serving the particular terminal device includes determining that the second TRP is to become the master TRP serving the terminal device based on that a relative relationship between the measurement qualities of the first TRP and the second TRP meets a first threshold.

A fifth aspect of the present disclosure relates to a method for a base station, where the base station controls multiple transmission and reception points (TRPs) to jointly serve a particular terminal device. The method includes: in response to that a first TRP and a second TRP are a master TRP and a secondary TRP respectively serving the terminal device, providing to the first TRP with measurement configuration information for the terminal device, where the measurement configuration information specifies that the terminal device performs measurement on at least the first TRP and the second TRP; and receiving a first update request message from the first TRP, where the first update request message indicates that the second TRP is to become the master TRP serving the terminal device and the first TRP is to become the secondary TRP serving the terminal device.

A sixth aspect of the present disclosure relates to a method for a terminal device, where the terminal device is served by a first TRP and a second TRP jointly, and the first TRP is a master TRP and the second TRP is a secondary TRP. The method includes: measuring the first TRP and the second TRP based on measurement configuration information received from the first TRP; and sending a measurement report to the first TRP based on that a relative relationship between measurement qualities of the first TRP and the second TRP meets a first threshold, where the measurement report comprises measurement qualities of at least the first TRP and the second TRP.

A seventh aspect of the present disclosure relates to a computer-readable storage medium with one or more instructions stored therein. In some embodiments, the one or more instructions, when executed by one or more processing circuits of an electronic device, cause the electronic device to perform methods according to various embodiments of the present disclosure.

An eighth aspect of the present disclosure relates to an apparatus for wireless communication, including means or unit for performing operations of various methods in the embodiments of the present disclosure.

The above summary is provided to summarize some exemplary embodiments in order to provide a basic understanding of the various aspects of the subject matter described herein. Therefore, the above-described features are merely examples and should not be construed as limiting the scope or spirit of the subject matter described herein in any way. Other features, aspects, and advantages of the subject matter described herein will become apparent from the Detailed Description described below in conjunction with the drawings.

BRIEF DESCRIPTION OF DRAWINGS

A better understanding of the present disclosure can be achieved by referring to the detailed description given hereinafter in conjunction with the accompanying drawings. The same or similar reference numerals are used in the accompanying drawings to denote the same or similar components. The accompanying drawings together with the following detailed description are included in the specification and form a part of the specification, and are intended to exemplify the embodiments of the present disclosure and explain the principles and advantages of the present disclosure. In the accompanying drawings:

FIG. 9A illustrates an exemplary MAC control element used to carry control channel indication information according to an embodiment of the present disclosure.

FIG. 9B illustrates an exemplary MAC control element used to carry a TCI state configuration indicator according to an embodiment of the present disclosure.

FIG. 10, FIG. 11A, and FIG. 11B illustrate exemplary methods for communication according to an embodiment of the present disclosure.

Although the embodiments described in the present disclosure may have various modifications and alternatives, specific embodiments thereof are illustrated as examples in the accompanying drawings and described in detail in this specification. However, it should be understood that the drawings and detailed description thereof are not intended to limit embodiments to the specified forms disclosed, but to cover all modifications, equivalents, and alternatives falling within the spirit and scope of the claims.

DESCRIPTION OF EMBODIMENTS

The following describes representative applications of various aspects of the devices and methods according to the present disclosure. The description of these examples is merely to add context and help to understand the described embodiments. Therefore, it is clear to those skilled in the art that the embodiments described below can be implemented without some or all of the specific details. In other instances, well-known process steps have not been described in detail to avoid unnecessarily obscuring the described embodiments. Other applications are also possible, and the solution of the present disclosure is not limited to these examples.

Figure 1:
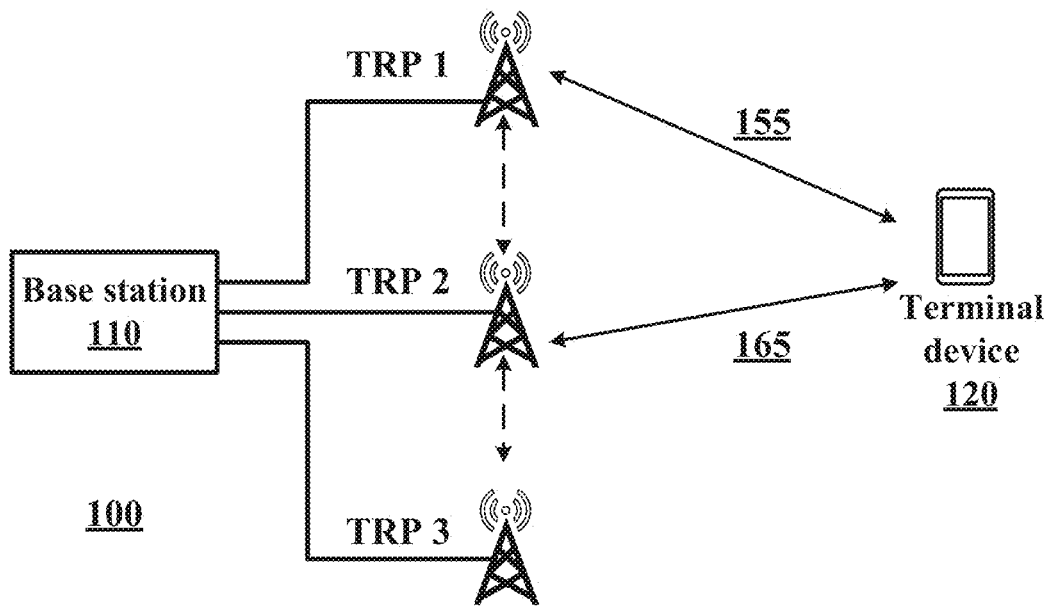
FIG. 1 illustrates an exemplary multiple transmission and reception points (multi-TRP) wireless communication system according to an embodiment of the present disclosure.

FIG. 1 illustrates an exemplary multiple transmission and reception points (multi-TRP) wireless communication system according to an embodiment. As shown in FIG. 1, a wireless communication system 100 includes a base station 110, a TRP 1 to a TRP 3, and a terminal device 120. The base station 110 and each of the TRPs may be configured to be coupled to each other via a wired line or a wireless link. The TRP 1 and the TRP 2 may be configured to communicate with the terminal device 120 via wireless links 155 and 165 to form a TRP group serving the terminal device 120. Specifically, the TRP 1 may be a Master TRP serving the terminal device 120, and the TRP 2 may be a Secondary TRP serving the terminal device 120.

The base station 110 may be configured to communicate with a network (for example, a core network of a cellular service provider, a telecommunications network such as a public switched telephone network (PSTN), and/or the Internet). In this way, the base station 110 can facilitate communication between the terminal devices 120 and another terminal device or a network. Optionally, backhaul links (as shown by dashed lines in FIG. 1) may be configured between TRPs, so that wireless network configuration information or context information of a terminal device can be synchronized among TRPs. For example, the foregoing backhaul links may include a wired line such as fiber. In the wireless communication system 100, the TRP 1 to TRP 3 can be deployed far away from the base station 110, extending coverage of the base station 110 and providing better quality of service for the terminal device 120.

A base station herein has a full breadth of its general meaning, and includes at least a wireless communication station for communication that is part of a wireless communication system or a radio system. Examples of base stations may include, but are not limited to: at least one of a base transceiver station (BTS) and a base station controller (BSC) in a GSM system; at least one of a radio network controller (RNC) and a Node B in a WCDMA system; eNBs in LTE and LTE-Advanced systems; access points (APs) in WLAN and WiMAX systems; and corresponding network nodes in communication systems to be developed or under development (for example, an eLTE eNB, a gNB in a 5G New Radio (NR) system or the like). Part of functions of a base station herein may also be implemented as an entity that has control functions on communication in the D2D, M2M, and V2V communication scenarios, or as an entity that is used for spectrum coordination in the cognitive radio communication scenario.

A terminal herein has a full breadth of its general meaning, for example, a terminal may be a mobile station (MS), user equipment (UE), and the like. The terminal may be implemented as device such as a mobile phone, a handheld device, a media player, a computer, a laptop computer, a tablet computer, or a wireless device of nearly any type. In some cases, a terminal may communicate using multiple wireless communication technologies. For example, a terminal may be configured to communicate using two or more of GSM, UMTS, CDMA2000, LTE, LTE-Advanced, NR, WiMAX, WLAN, Bluetooth, and so on. In some cases, a terminal may alternatively be configured to communicate using only one wireless communication technology.

TRPs herein have a full breadth of their general meaning, and may be deployed separately or deployed together with a base station. In embodiments, a TRP may have a function of transmission and reception, and a base station may perform a specified control function on a TRP coupled to the base station. Alternatively, a TRP may have some layer 2 or layer 3 control functions, and even have functions that are completely or basically the same as a base station.

It should be understood that, FIG. 1 illustrates only one of multiple layouts of multi-TRP, and embodiments of the present disclosure may be implemented in any appropriate layout based on needs. For example, based on needs, the base station 110 and any TRP may be collocated and configured to be a same entity, and the entity performs original functions and operations of the base station 110 and the TRP.

In an embodiment, multiple TRPs (namely, the TRP 1 to the TRP 3) coupled to the base station 110 in FIG. 1 may have different cell IDs (cell-ID), and the respective TRP may send downlink control channels (for example, PDCCHs) individually on respective control resource sets (CORESETs) and search spaces. Such a wireless communication system 100 may be referred to as a Multi-TRP communication system based on Multi-PDCCH.

In this embodiment, the master TRP (namely, TRP 1) is responsible for radio resource control (RRC) connection and communication with the terminal device 120 under the control of the base station 110. The secondary TRP (namely, TRP 2) has no RRC connection and communication with the terminal device 120. An RRC context of the terminal device 120 is stored in the base station, and the base station controls the master TRP 1 to establish an RRC connection and communication with the terminal device 120. From the respective of the terminal device 120, a value of ServCellIndex of a cell corresponding to the master TRP 1 is 0, and a value of ServCellIndex of a cell corresponding to the secondary TRP 2 is not 0.

In this embodiment, the master TRP 1 and the secondary TRP 2 share a MAC entity in the master TRP 1, and use separate physical layer resource to communicate with the terminal device 120. In the downlink, both the master TRP 1 and the secondary TRP 2 provide transmission of a control channel and a shared channel (for example, a PDCCH and a PDSCH), so as to send control signals and data signals separately. In a case that backhaul links do not exist between TRPs or backhaul links are limited, such arrangement in which master and secondary TRPs in a TRP group send control signals separately is advantageous.

In this embodiment, under the control of the base station 110, control resource sets and search spaces corresponding to the master TRP 1 and the secondary TRP 2 are configured to the terminal device 120 through the master TRP 1, and the master TRP 1 and the secondary TRP 2 use corresponding control resource sets and search spaces to send PDCCHs to the terminal device 120. Correspondingly, the terminal device can decode and receive the PDCCHs of the respective TRPs through blind detection of the control resource sets and search spaces of the master TRP 1 and the secondary TRP 2, and then decode and receive corresponding PDSCHs based on the PDCCHs.

In another embodiment, multiple TRPs (namely, TRP 1 to TRP 3) coupled to the base station 110 in FIG. 1 may have the same cell ID (cell-ID), and only the master TRP 1 may send downlink control channels (for example, PDCCHs). Such a wireless communication system 100 may be referred to as a Multi-TRP communication system based on Single-PDCCH.

In this embodiment, the master TRP (namely, TRP 1) is responsible for radio resource control (RRC) connection and communication with the terminal device 120 under the control of the base station 110. The secondary TRP (namely, TRP 2) has no RRC connection and communication with the terminal device 120. An RRC context of the terminal device 120 is stored in the base station, and the base station controls the master TRP 1 to establish an RRC connection and communication with the terminal device 120.

In this embodiment, the master TRP 1 and the secondary TRP 2 share a MAC entity in the master TRP 1, and use separate physical layer resource to communicate with the terminal device 120. In the downlink, the master TRP 1 provides transmission of a control channel and a shared channel (for example, a PDCCH and a PDSCH) to send control signals and data signals, and the secondary TRP 2 only provides transmission of a shared channel (for example, a PDSCH) to send data signals.

In this embodiment, under the control of the base station 110, only the master TRP 1 can use corresponding control resource set and search space to send a PDCCH to the terminal device 120. Correspondingly, the terminal device can decode and receive the PDCCH of the master TRP 1 through blind detection of the control resource set and search spaces of the master TRP 1, and then decode and receive PDSCHs of both the master TRP 1 and the secondary TRP 2 based on the PDCCH.

In one or multiple embodiments, different index values may be set for control resource sets of the master TRP 1 and the secondary TRP 2, for example, a CORESETPoolIndex value. Bit information in control signaling may be used to indicate an activation state of the control resource set of each TRP. Specifically, in the control signaling, the value of a bit corresponding to the CORESETPoolIndex of the control resource set can be set to 0 or 1, indicating that the corresponding control resource set is in a deactivated or activated state. For example, if the CORESETPoolIndex value of the control resource set of the TRP 1 is set to 1 in the control signaling, the control resource set can be used by the TRP 1 to send a PDCCH. In this way, an information bit corresponding to the CORESETPoolIndex can be used to instruct the terminal device 120 to decode and receive the PDCCH in the corresponding control resource set and search space.

In a scenario where the terminal device 120 is moving, the links 155 and 165 with the TRP 1 and the TRP 2 may degrade in quality or even be lost. Corresponding, the terminal device 120 cannot receive downlink signals from the multiple TRPs, which for example results in negative impact on the communication rate. Particularly, in the Single-PDCCH embodiment, if the link 155 with the master TRP 1 degrades in quality or is lost, the terminal device 120 cannot receive and decode a downlink signal from any other TRP because of being unable to correctly receive and decode the PDCCH. Therefore, the mobility management solution specific to the multi-TRP scenario of the wireless communication system 100 is expected.

In the embodiments of the present disclosure, the terminal device 120 can measure TRP members in the TRP group serving the terminal device 120 based on measurement configuration information. The TRP group serving the terminal device 120 can be updated based at least on measurement qualities of the TRP members. For example, roles of the master TRP and the secondary TRP can be switched among the TRP members in the TRP group. In this way, the measurement quality of the master TRP is always higher, which can avoid TRP handover and a corresponding long handover delay resulted from the master TRP degrading in quality. For another example, the secondary TRP with degraded quality in the TRP group can be replaced with a TRP outside the TRP group, so as to ensure that the TRP members in the TRP group are TRPs with higher quality and avoid the TRP handover and the corresponding long handover delay.

In the embodiments of the present disclosure, a TRP measurement result reporting even can be triggered based on a relative relationship between measurement qualities of TRP members serving the terminal device 120, and the TRP group serving the terminal device 120 can be updated in a relatively short time through a particular signaling flow, as described in detailed below. Various embodiments of the present disclosure are described below with reference to the context of the wireless communication system 100 in FIG. 1.

Figure 2A:
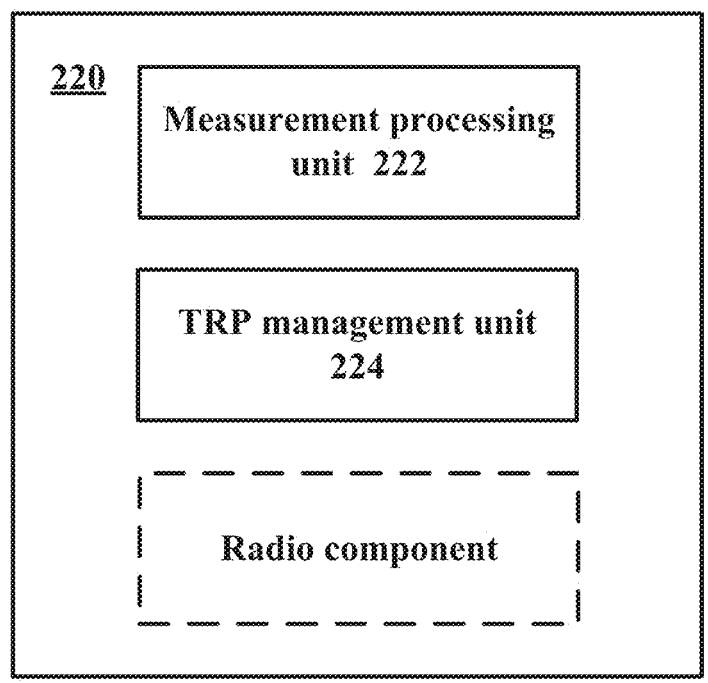
FIG. 2A illustrates an exemplary electronic device for a TRP according to an embodiment of the present disclosure.

FIG. 2A illustrates an exemplary electronic device for a TRP according to an embodiment. An electronic device 220 illustrated in FIG. 2A may include various units to implement various embodiments of the present disclosure. An electronic device 220 may include a measurement processing unit 222 and a TRP management unit 224. In different implementations, the electronic device 220 may be implemented as any TRP or a part thereof in FIG. 1, or may be implemented as a device that controls the TRP or is related to the TRP by other means. The various operations described below in connection with a TRP can be implemented by the units 222 to 224 of the electronic device 220 or by other possible units.

The electronic device 220 may be applied to a master TRP or is associated with the master TRP. For example, the master TRP is the TRP 1 in FIG. 1. In an embodiment, the measurement processing unit 222 of the electronic device 220 may be configured to provide measurement configuration information to the terminal device 120 in response to that the TRP 1 is the master TRP serving the terminal device 120. The measurement configuration information specifies that at least the TRP 1 and another one or more TRPs (for example, a TRP 2) are to be measured. The measurement processing unit 222 may be further configured to receive a measurement report from the terminal device 120. The measurement report comprises measurement qualities of the TRP 1 and the another one or more TRPs. In the embodiment, the TRP management unit 224 of the electronic device 220 may be configured to update TRPs serving the terminal device 120 based at least on measurement qualities of the TRP 1 and the another one or more TRPs.

The updating TRPs serving the terminal device 120 may include updating a member in a TRP group or updating the role of a member in the TRP group. For example, the updating TRPs serving the terminal device 120 may include determining that roles of the TRP 1 and the TRP 2 are switched to make the TRP 2 become the master TRP serving the terminal device 120, based on that a relative relationship between measurement qualities of the TRP 1 and the TRP 2 meets a first threshold.

The electronic device 220 may be applied to a secondary TRP or is associated with the master TRP. For example, the secondary TRP is the TRP 2 in FIG. 1. In an embodiment, the measurement processing unit 222 of the electronic device 220 may be configured to receive a TRP update control message from the base station 110 in response to that the TRP 2 is the secondary TRP serving the terminal device 120. The TRP management unit 224 of the electronic device 220 may be configured to: in response to the TRP update control message indicating that the TRP 2 is to become the master TRP for the terminal device 120, prepare layer 2 resources, and send a TRP update acknowledgment message to the base station 110. In another embodiment, the measurement processing unit 222 of the electronic device 220 may be configured to: in response to the update control message indicating that the TRP 2 no longer serves the terminal device 120, release a connection with the terminal device 120.

Figure 2B:
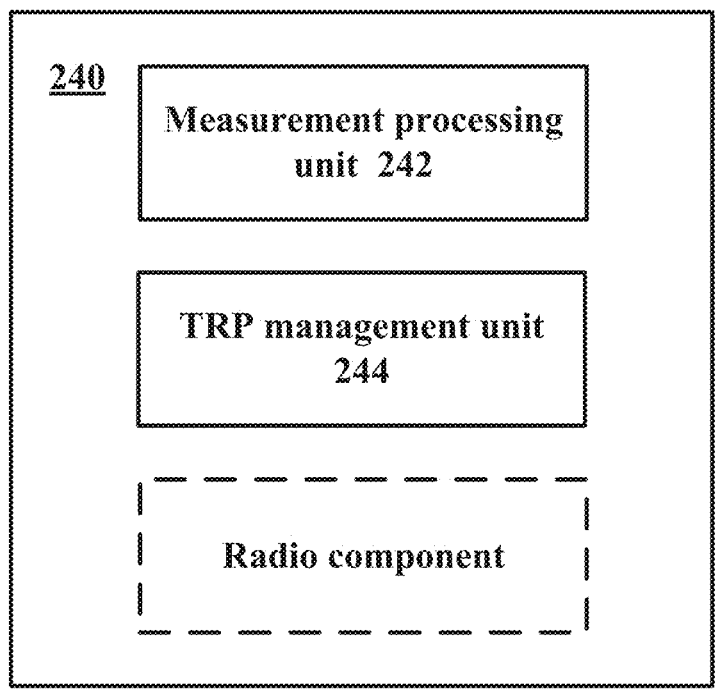
FIG. 2B illustrates an exemplary electronic device for a base station according to an embodiment of the present disclosure.

FIG. 2B illustrates an exemplary electronic device for a base station according to an embodiment. An electronic device 240 illustrated in FIG. 2B may include various units to implement various embodiments of the present disclosure. An electronic device 240 may include a measurement processing unit 242 and a TRP management unit 244. In different implementations, the electronic device 240 may be implemented as the base station 110 in FIG. 1 or a part thereof, or implemented as a device (for example, a base station controller) that controls the base station 110 or is related to the base station 110 by other means or a part of such device. The various operations described below in connection with a base station can be implemented by the units 242 to 244 of the electronic device 240 or by other possible units.

Referring to the context of the wireless communication system 100 in FIG. 1, in the embodiment, the measurement processing unit 242 of the electronic device 240 may be configured to provide to the TRP 1 with measurement configuration information for the terminal device 120 in response to that the TRP 1 and the TRP 2 are a master TRP and a secondary TRP respectively serving the terminal device 120. The measurement configuration information specifies that the terminal device 120 performs measurement on at least the TRP 1 and the TRP 2. The TRP management 244 of the electronic device 240 may be configured to receive a TRP update request message from the TRP 1. The TRP update request message may request updating a member in a TRP group or updating the role of a member in the TRP group. For example, the update request message indicates that the TRP 2 is to become the master TRP serving the terminal device 120 and the TRP 1 is to become the secondary TRP serving the terminal device 120. The TRP management unit 244 may be further configured to perform corresponding processing based on the update request message.

Figure 2C:
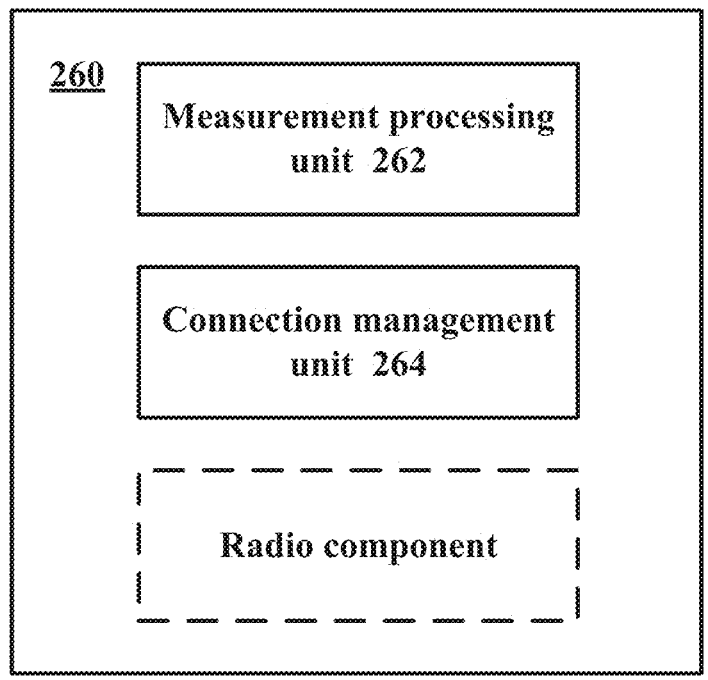
FIG. 2C illustrates an exemplary electronic device for a terminal device according to an embodiment of the present disclosure.

FIG. 2C illustrates an exemplary electronic device for a terminal device according to an embodiment. An electronic device 260 illustrated in FIG. 2C may include various units to implement various embodiments of the present disclosure. The electronic device 260 may include a measurement processing unit 262 and a connection management unit 264. In different implementations, the electronic device 260 may be implemented as the terminal device 120 in FIG. 1 or a part thereof. The various operations described below in connection with a terminal device can be implemented by the units 262 to 264 of the electronic device 260 or by other possible units.

Still referring to the context of the wireless communication system 100 in FIG. 1, the terminal device 120 is served by the TRP 1 and the TRP 2 jointly, and the TRP 1 is a master TRP and the TRP 2 is a secondary TRP. In the embodiment, the measurement processing unit 262 of the electronic device 260 may be configured to measure the TRP 1 and at least the TRP 2 based on measurement configuration information received from the TRP 1. The measurement processing unit 262 may be further configured to send a measurement report to the first TRP based on that a relative relationship between measurement qualities of the TRP 1 and the TRP 2 meets a first threshold. The measurement report may include measurement qualities of at least the TRP 1 and the TRP 2. The connection management unit 264 of the electronic device 260 may be configured to establish or release a connection with each TRP under the control of the master TRP.

In the embodiments, the electronic devices 220 to 260 may be implemented at a chip level, or may be implemented at a device level by including other components (for example, a radio component indicated by dashed lines in figures). For example, each electronic device may work as a communication device in the form of a whole machine.

It should be noted that the foregoing various units are only logical modules divided based on logical functions implemented by the units, and are not intended to limit specific implementations, for example, the units may be implemented by software, hardware, or a combination of software and hardware. In actual implementations, the foregoing various units may be implemented as independent physical entities, or may be implemented by a single entity (for example, a processor (CPU, DSP, or the like), or an integrated circuit). A processing circuit may refer to various implementations of a digital circuitry, an analog circuitry, or a mixed signal (a combination of analog and digital) circuitry that performs functions in a computing system. The processing circuit may include, for example, a circuit such as an integrated circuit (IC), an application specific integrated circuit (ASIC), a portion or circuit of a separate processor core, the entire processor core, a separate processor, a programmable hardware device such as a field programmable gate array (FPGA), and/or a system including multiple processors.

The exemplary electronic devices according to the embodiments, as well as general operations are described above with reference to FIG. 2A to FIG. 2C. The following will further describe these operations in detail.

Measurement Configuration and Measurement Reporting

Figure 3:
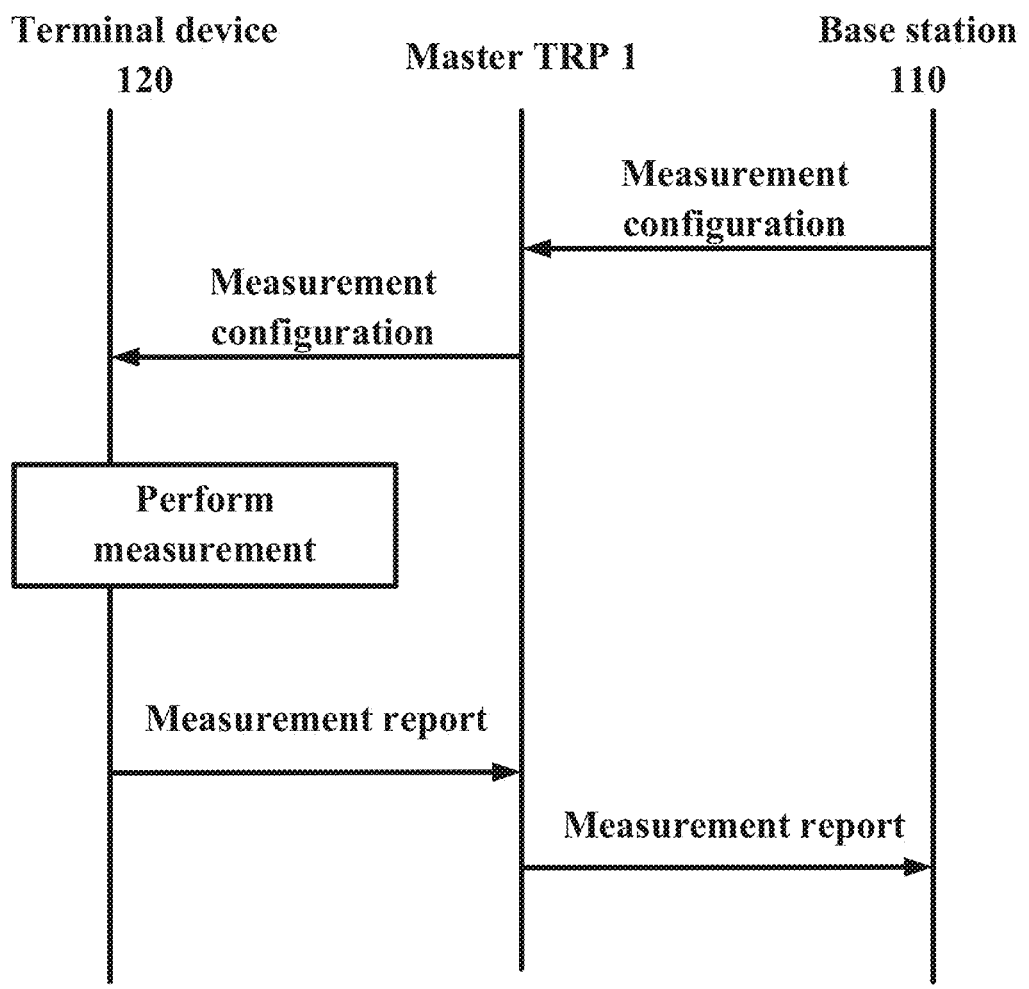
FIG. 3 illustrates an exemplary signaling flow of measurement configuration and measurement reporting according to an embodiment of the present disclosure.

FIG. 3 illustrates an exemplary signaling flow of measurement configuration and measurement reporting according to an embodiment. The base station 110, the master TRP 1, and the terminal device 120 may use respective measurement processing units to perform the signaling flow.

As shown in FIG. 3, after the terminal device 120 establishes connections with the master TRP 1 and the secondary TRP 2, under the control of the base station 110, the master TRP 1 sends measurement configuration information to the terminal device 120 in an RRC_CONNECTED state. Next, the terminal device 120 performs measurement on respective TRPs including the master TRP 1 based on the measurement configuration information, and sends a measurement report to the master TRP 1 in response to a measurement report event being triggered. Optionally, the master TRP 1 may send an original measurement report or a processed measurement report to the base station 110.

The measurement configuration information may specify measurement objects for the terminal device 120. In addition to the master TRP 1 and the secondary TRP 2, the measurement objects may further include another one or more TRPs, for example, the TRP 3 detected by the terminal device 120 based on a synchronization signal, a broadcast signal, or the like (for example, SS/PBCH in the NR). Additionally, the measurement configuration information may further specify a signal to be measured by the terminal device 120. For example, it can be specified that the terminal device 120 acquires measurement qualities of the master TRP 1 and the secondary TRP 2 by measuring, a reference signal such as a CSI-RS, and acquires the measurement quality of the TRP 3 by measuring a synchronization signal, a broadcast signal or the like, such as SS/PBCH.

In the present disclosure, the measurement quality of a TRP may refer to link quality reflected by a measurement result of the TRP. The measurement quality of the master TRP and the secondary TRP may be reflected by measured Reference Signal Received Power (RSRP), Reference Signal Received Quality (RSRQ), Reference Signal-Signal to Interference plus Noise Ratio (RS-SINR), or signal-to-noise-interference ratio (SINR) for the master TRP and the secondary TRP.

The measurement configuration information can also specify an event type that triggers the terminal device 120 to send a measurement report, so that the terminal device 120 sends the measurement report to the master TRP 1 when the event type is present during measurement. The event types that trigger measurement reports and TRP management operations based on measurement reports are further described below.

In an embodiment, a measurement report may include the measurement qualities of the master TRP and the secondary TRP. Alternatively and additionally, the measurement report may further include a list of another observed TRPs, and the list includes an identifier and measurement quality of each TRP. In the list, information of TRPs may be sorted in order of measurement quality.

Event Types Triggering a Measurement Report

In the embodiment, the event types that trigger a measurement report may be defined based on a relative relationship between the measurement qualities of the master TRP 1 and the secondary TRP 2. In the present disclosure, the event type may be referred to as an event type C (Event C). For example, within a time to trigger (TTT), if the foregoing relative relationship meets a first threshold, the terminal device 120 may be triggered to send to the master TRP 1 a measurement report corresponding to the time to trigger. A formula (1) below is an example of the event type C.

$$\alpha > \alpha_0, \qquad \text{(formula 1)}$$

where $\alpha = Q_{Secondary\_TRP}/Q_{Master\_TRP}$ or $\alpha = Q_{Secondary\_TRP} - Q_{Master\_TRP}$, the threshold $\alpha_0$ may be a parameter configured through higher layer signaling (for example, RRC layer signaling) for the terminal device 120 by the master TRP 1 under the control of the base station 110. Multiple values may be configured to $\alpha_0$ for the terminal device 120, so as to control to trigger a measurement report in different cases.

According to the definition of the parameter α, the relative relationship between the measurement qualities of the master TRP 1 and the secondary TRP 2 may be a ratio of or a difference between the measurement qualities of the two. In other examples, the relative relationship may have other forms, such as a combination of the ratio and difference and a logarithm of the ratio or difference. Formula (1) reflects that the measurement quality of the secondary TRP 2 is better than the measurement quality of the master TRP 1 to an extent which can be set and adjusted based on the value of the threshold $\alpha_0$. When the event type C is defined and a measurement report can be triggered upon an event type C, the master TRP 1 and the base station 110 can manage or update the TRP group serving the terminal device 120 based on the relative relationship between the measurement qualities of the master TRP 1 and the secondary TRP 2.

In an embodiment, additionally or alternatively, the event types that trigger a measurement report may be defined based on a relative relationship between the measurement qualities of the secondary TRP 1 and another TRP outside the TRP group serving the terminal device 120. In the present disclosure, the event type may be referred to as an event type B (Event B). For example, within a time to trigger (TTT), if the foregoing relative relationship meets a second threshold, the terminal device 120 may be triggered to send to the master TRP a measurement report corresponding to the time to trigger. A formula (2) below is an example of the event type B.

$$\beta > \beta_0 \qquad \text{(Formula 2)}$$

where $\beta = Q_{Other\_TRP}/Q_{Secondary\_TRP}$ or $\beta = Q_{Other\_TRP} - Q_{Secondary\_TRP}$, the threshold $\beta_0$ may be a parameter configured through higher layer signaling (for example, RRC layer signaling) for the terminal device 120 by the master TRP under the control of the base station 110. Multiple values may be configured to $\beta_0$ for the terminal device 120, so as to control to trigger a measurement report in different cases.

According to the definition of the parameter β, the relative relationship between the measurement qualities of the secondary TRP 2 and anther TRP may be a ratio of or a difference between the measurement qualities of the two. In other examples, the relative relationship may have other forms, such as a combination of the ratio and difference and a logarithm of the ratio or difference. Formula (2) reflects that the measurement quality of the another TRP is better than the measurement quality of the secondary TRP to an extent which can be set and adjusted based on the value of the threshold $\beta_0$. When the event type B is defined and a measurement report can be triggered upon an event type B, the master TRP or the base station 110 can manage or update the TRP group serving the terminal device 120 based on the relative relationship between the measurement qualities of the secondary TRP and other TRPs.

Examples of TRP Management Operations

Figure 4A:
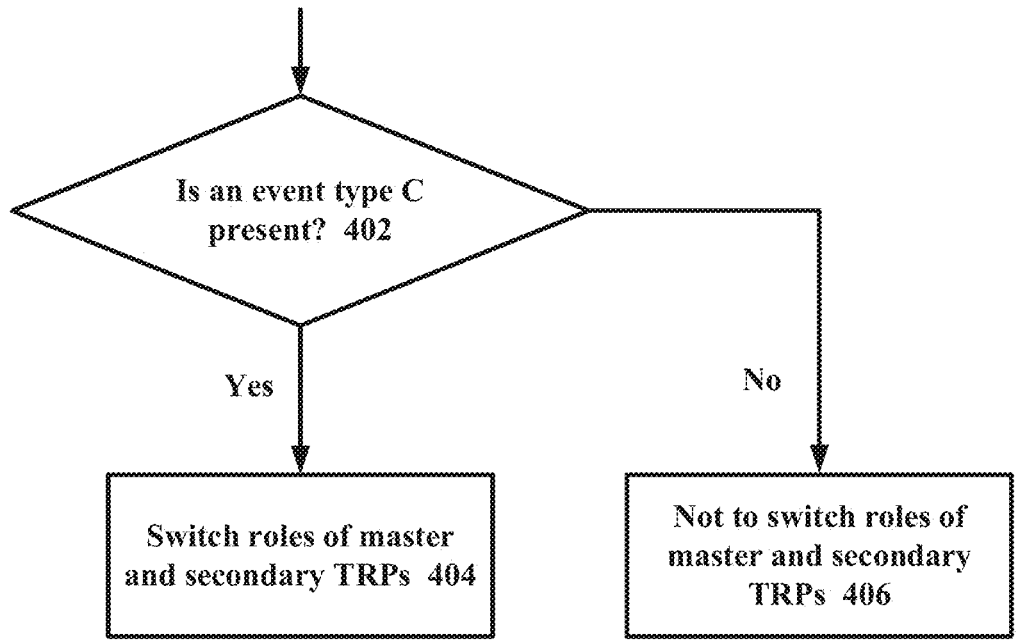
FIGS. 4A to 4C illustrate exemplary operations of TRP management based on a measurement report according to an embodiment of the present disclosure.

Exemplary operations for TRP management according to an embodiment of the present disclosure will be described below with reference to the context of the wireless communication system 100 in FIG. 1. In an embodiment, managing the TRP group may include switching roles of the master and secondary TRPs. FIG. 4A illustrates an exemplary operation of TRP management based on a measurement report according to an embodiment. After the terminal device 120 (for example, the measurement processing unit 262) sends a measurement report, the master TRP 1 (for example, the TRP management unit 224) may perform the operation based on whether the measurement report includes an event type C.

As shown in FIG. 4A, upon a measurement report is received at 402, the master TRP 1 determines whether an event type C is present in the measurement report. If an event type C is present, it indicates that the relative relationship between the measurement qualities of the master TRP 1 and the secondary TRP 2 meets the first threshold $\alpha_0$, and the measurement quality of the secondary TRP 2 is better than the measurement quality of the master TRP 1. Accordingly, at 404, the master TRP 1 determines that the roles of the master and secondary TRPs are switched between the TRP 1 and the TRP 2. If an event type C is not present, it indicates that the measurement quality of the master TRP 1 is better than the measurement quality of the secondary TRP 2. Accordingly, at 406, the master TRP 1 determines the roles of the master and secondary TRPs are temporarily not switched between the TRP 1 and the TRP 2.

The TRP management operations illustrated in FIG. 4A can be constantly performed on TRPs serving the terminal device 120. For example, after a role switch, if a subsequent measurement report indicates that the measurement quality of the TRP 1 is comparatively better, the TRP 1 can become the master TRP again through another role switch. It can be understood that if the TRP 1 always plays the role of the master TRP without a role switch, a handover may be caused when its measurement quality degrades. The complicated procedure and delay associated with the handover are not desired. In this case, the measurement quality of the secondary TRP 2 may be good enough to avoid a handover. Therefore, based on the operations illustrated in FIG. 4A, it can be ensured one of the TRP 1 and the TRP 2 with better measurement quality becomes the master TRP serving the terminal device 120. This can avoid a forced handover from the master TRP or delay such handover.

Figure 4B:
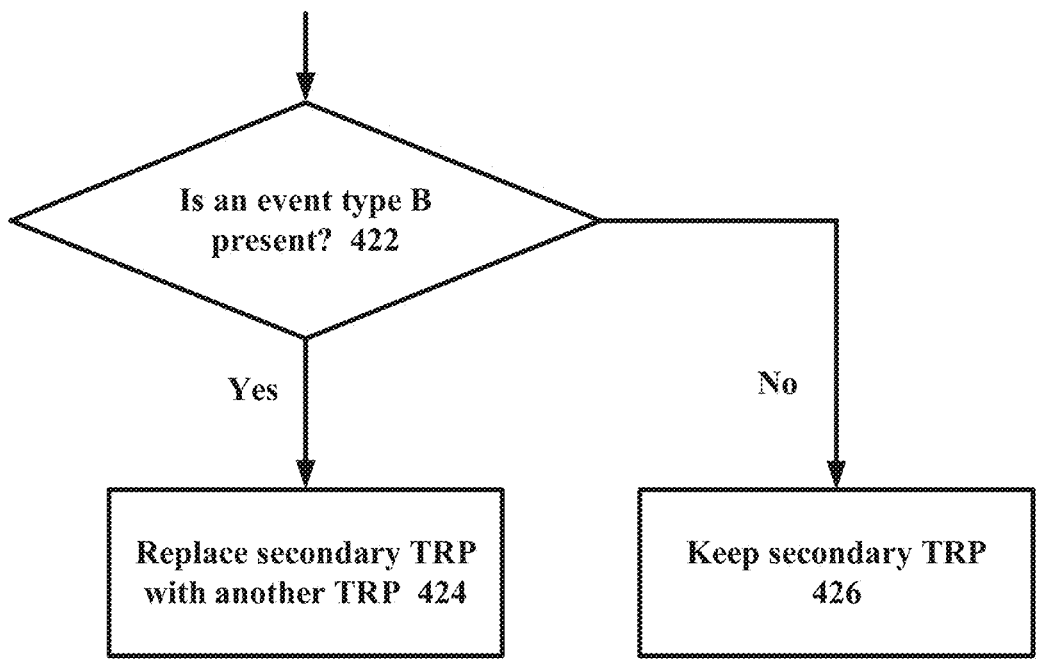

In an embodiment, managing the TRP group may further include updating a member in the TRP group serving the terminal device 120. FIG. 4B illustrates another exemplary operation of TRP management based on a measurement report according to an embodiment. After the terminal device 120 (for example, the measurement processing unit 262) sends a measurement report, the master TRP 1 and the base station 110 (for example, the TRP management units 224, 244) may perform the operation based on whether the measurement report includes an event type B.

As shown in FIG. 4B, once a measurement report is received at 422, the master TRP 1 determines whether an event type B is present in the measurement report. If an event type B is present, it indicates that a relative relationship between measurement qualities of the secondary TRP 2 and another TRP (for example, the TRP 3) meets a first threshold $\beta_0$ and the measurement quality of the TRP 3 is better than the measurement quality of the secondary TRP 2. Accordingly, at 424, the master TRP 1 determines that the TRP 3 is added to the group serving the terminal device 120 and replaces the original secondary TRP 2 as the new secondary TRP. If an event type C is not present, it indicates that the measurement quality of the another TRP is not better than the measurement quality of the secondary TRP 2. Accordingly, at 426, the master TRP 1 determines that the secondary TRP 2 is kept and not replaced.

The TRP management operations illustrated in FIG. 4B can be constantly performed on TRPs serving the terminal device 120. Accordingly, the secondary TRP can be updated to a TRP with better measurement quality with the terminal device 120 being connected to the master TRP. This optimizes the measurement qualities of members in the TRP group. This is advantageous for optimizing the connection quality of the terminal device 120. Further, for example, with reference to the TRP management operation described in FIG. 4A, the secondary TRP with better quality may become the new master TRP through role switch, which optimizes the measurement quality of the master TRP. This can avoid a forced handover from the master TRP or delay such handover to a larger extent.

Figure 4C:
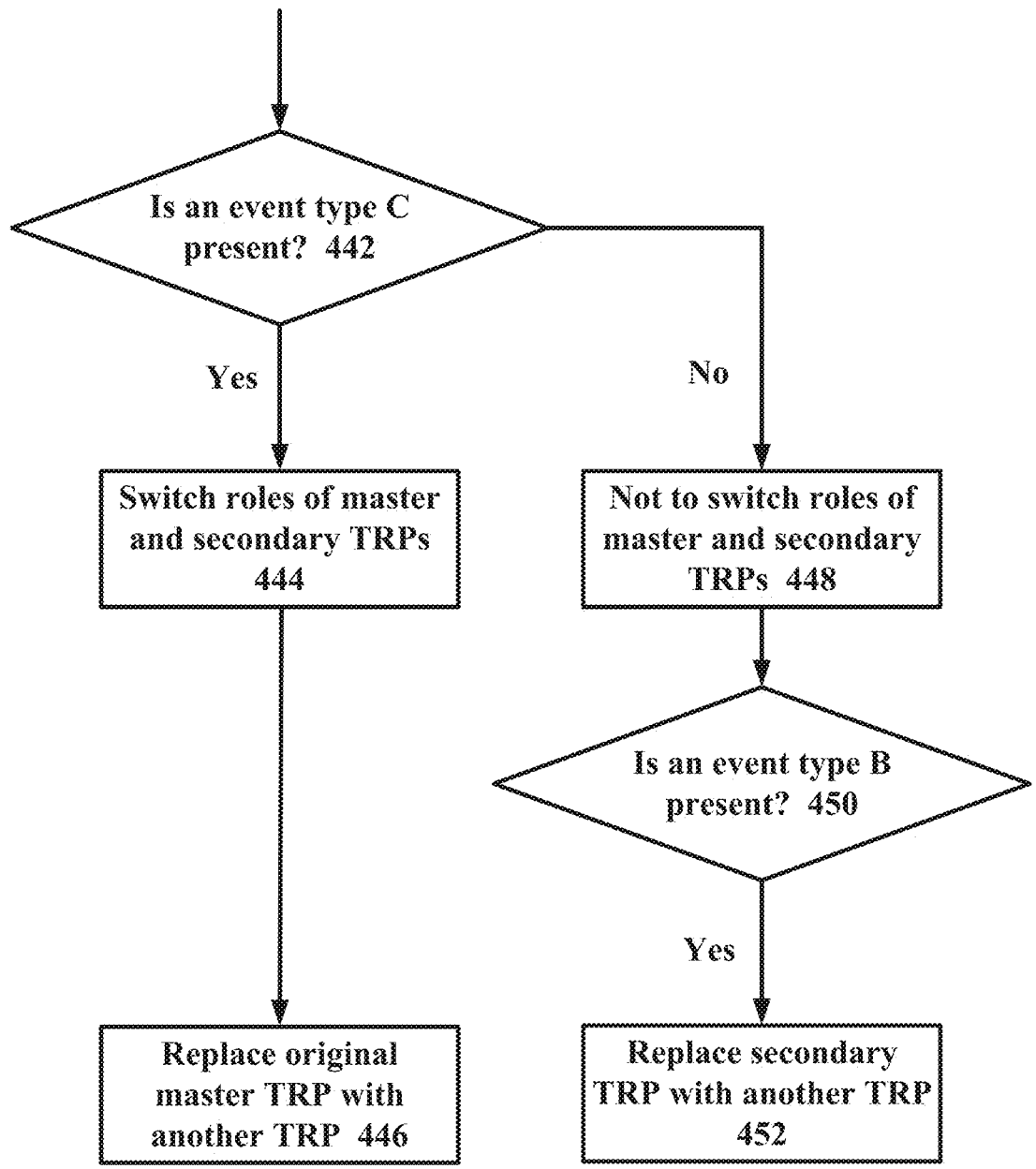

In an embodiment, managing the TRP group may include a combination of operations of switching roles of the master and secondary TRPs and updating members in the TRP group. FIG. 4C illustrates still another exemplary operation of TRP management based on a measurement report according to an embodiment. The master TRP 1 and the base station 110 (for example, the TRP management units 224, 244) may perform the operation based on whether the measurement report includes an event type C or an event type B as well as on measurement quality information in the measurement report.

As shown in FIG. 4C, once a measurement report is received at 442, the master TRP 1 determines whether an event type C is present in the measurement report. If an event type C is present, it indicates that the relative relationship between the measurement qualities of the master TRP 1 and the secondary TRP 2 meets the first threshold $\alpha_0$, and the measurement quality of the secondary TRP 2 is better than the measurement quality of the master TRP 1. Accordingly, at 444, the master TRP 1 determines the roles of the master and secondary TRPs are switched between the TRP 1 and the TRP 2. Next, at 446, the base station 110 may determine that measurement quality of another TRP (for example, the TRP 3) is better than measurement quality of the original master TRP 1 (which is to become the secondary TRP after the role switch) based on the measurement quality information in the measurement report, and determines that the TRP 3 is added to the TRP group serving the terminal device 120 and replaces the TRP 1 as the new secondary TRP. That is, after the update, members in the TRP group serving the terminal device 120 are changed from the master TRP 1 and the secondary TRP 2 to the master TRP 2 and the secondary TRP 3.

At 442, if it is determined that an event type C is not present, it indicates that the measurement quality of the master TRP 1 is better than the measurement quality of the secondary TRP 2. Accordingly, at 448, the master TRP 1 determines the roles of the master and secondary TRPs are temporarily not switched between the TRP 1 and the TRP 2. Next, at 450, the master TRP 1 may determine that measurement quality of another TRP (for example, the TRP 3) is better than the measurement quality of the TRP 2 (the secondary TRP) based on the that an event type B is present in the measurement report, and determines that the TRP 3 replaces the TRP 2 as the new secondary TRP. That is, after the update, members in the TRP group serving the terminal device 120 are changed from the master TRP 1 and the secondary TRP 2 to the master TRP 1 and the secondary TRP 3.

The TRP management operations illustrated in FIG. 4C can be constantly performed on TRPs serving the terminal device 120. Accordingly, on the one hand, the secondary TRP with better quality may become the new master TRP through role switch. This optimizes the measurement quality of the master TRP, and can avoid a forced handover from the master TRP or delay such handover. On the other hand, the secondary TRP can be updated to a TRP with better measurement quality with the terminal device 120 being connected to the master TRP. This optimizes the measurement quality of members in the TRP group. By role switch between the master and secondary TRPs and replacing the secondary TRP with a TRP with better measurement quality, a forced handover from the master TRP can be avoided or delayed in time, to a largest extent.

Example of TRP Management Signaling Flow

Figure 5:
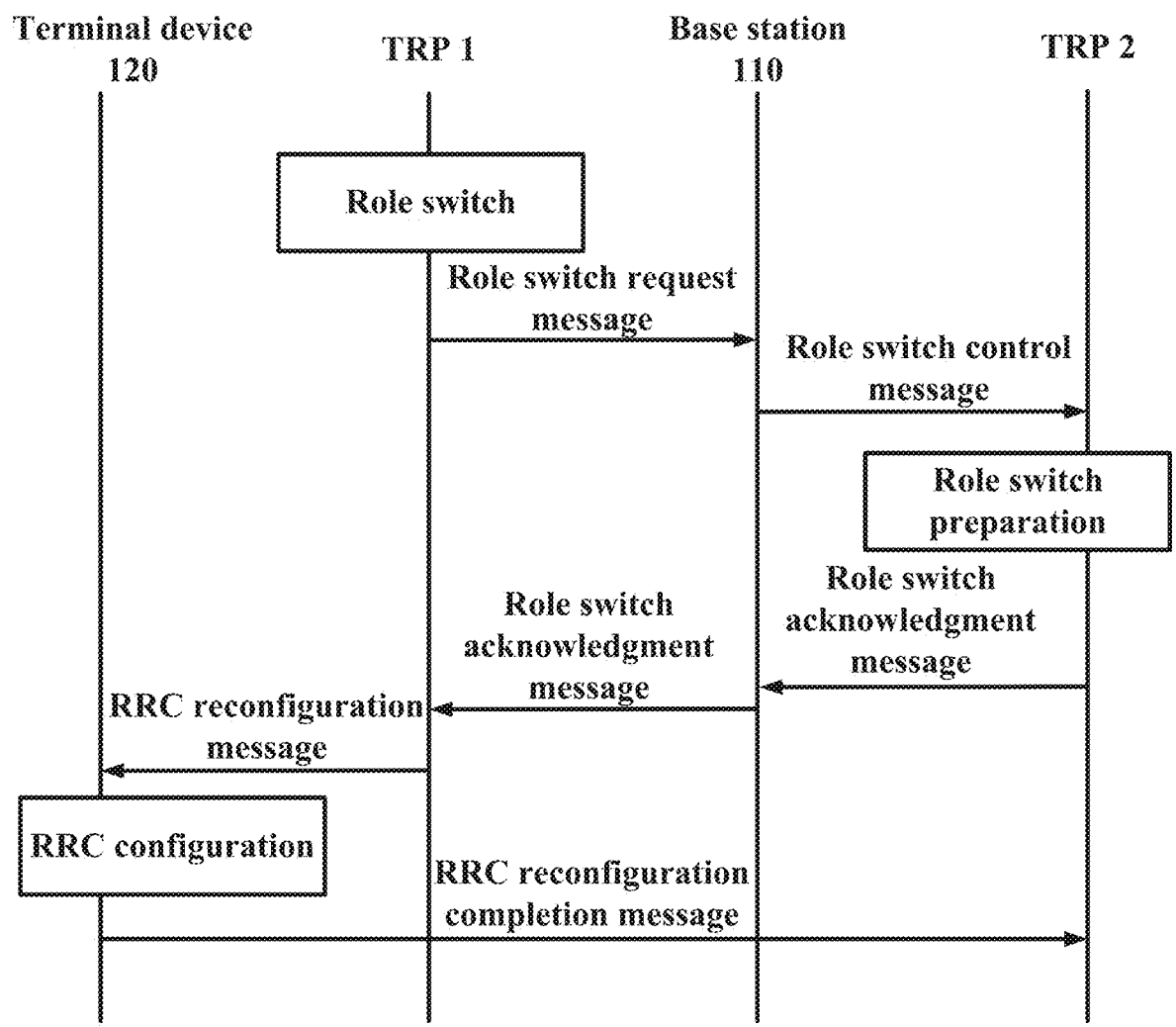
FIGS. 5 to 8 illustrate exemplary signaling flows of implementing TRP updates according to an embodiment of the present disclosure.

An exemplary signaling flow of TRP management according to an embodiment of the present disclosure is described below with reference to the context of the wireless communication system 100 in FIG. 1. FIG. 5 illustrates an exemplary signaling flow of implementing a role switch between the master and secondary TRPs according to an embodiment. The signaling flow may be used to implement the TRP management operations illustrated in FIG. 4A. The master TRP 1, the base station 110 (for example, the TRP management units 224, 244), and a terminal device (for example, the connection management unit 264) may perform the signaling flow.

As shown in FIG. 5, in response to determining that master/secondary TRP roles of the TRP 1 and the TRP 2 are to be switched, the master TRP 1 sends a TRP update request message to the base station 110, which is a role switch request message here. The base station 110 identifies that the TRP 2 is to take the master TRP role in response to the role switch request message from the master TRP 1. Accordingly, the base station 110 sends a TRP update control message to the TRP 2, which is a role switch control message here. The control message may include information required by the TRP 2's layer 2 preparation for the role switch. In one embodiment, the base station 110 may further send RRC connection related information of the terminal device 120 to the TRP 2, so that an RRC connection can be established between the TRP 2 and the terminal device 120.

As shown in FIG. 5, the TRP 2 may perform layer 2 preparation for a role switch with the TRP 1, in response to the role switch control message received from the base station 110. Specifically, the layer 2 preparation may include establishing a MAC entity, or the layer 2 preparation may additionally include establishing an RLC entity and even establishing a PDCP entity. In a multi-PDCCH based wireless communication system 100, both the TRP 1 and the TRP 2 transmit PDCCH signals on corresponding control resource sets and search spaces before and after the role switch. In a Single-PDCCH based wireless communication system 100, the TRP 1 transmits PDCCH signals on a corresponding control resource set and search space before the role switch, and the TRP 2 does not transmit PDCCH signals. During the role switch, the base station 110 may configure that the TRP 2 transmits PDCCH signals on a corresponding control resource set and search space after the role switch is completed. After the role switch, the TRP 1 stops transmitting PDCCH signals. In a Single-PDCCH based embodiment, the terminal device 120 may be notified, for example, by using MAC layer signaling, of receiving and decoding PDCCHs on the control resource set and search space corresponding to the TRP 2 after the role switch is completed, and the terminal device 120 may be notified, for example, by using MAC layer signaling, of TCI state configuration required to receive the PDCCHs transmitted by the TRP 2. An example of this aspect is described below with reference to FIGS. 9A and 9B.

As shown in FIG. 5, once the preparation for the role switch is completed, the TRP 2 may return a TRP update acknowledgment message to the base station 110, which is a role switch acknowledgment message here, indicating that the TRP 2 is ready for the role switch. Upon receiving the role switch acknowledgment message from the TRP 2, the base station 110 may forward the role switch acknowledgment message to the TRP 1, indicating that the TRP 2 is ready for the role switch. The base station 110 may further send an RRC reconfiguration message to the TRP 1, so that the terminal device 120 can establish an RRC connection with the new master TRP 2. The new master TRP 2 is the original secondary TRP of the terminal device 120, so they already have a physical layer connection. Therefore, compared with a general RRC reconfiguration message, the RRC reconfiguration message herein may not include new transmission configuration indicator (TCI) state configuration information. This helps simplify the procedure for establishing an RRC connection between the terminal device 120 and the TRP 2, thereby reducing operation delay.

As shown in FIG. 5, upon receiving the RRC reconfiguration message, the terminal device 120 may perform RRC reconfiguration. Specifically, the terminal device 120 may establish RRC communication with the new master TRP 2 by using the previous TCI state configuration information of the TRP 2. Compared with general mobility management operations (such as a handover), the terminal device 120 does not need to reconfigure its own MAC entity, so that the master and secondary TRP role switch operations can be completed quickly, avoiding corresponding operation delay.

Upon completion of the RRC reconfiguration, the terminal device 120 may send an RRC reconfiguration completion message to the TRP 2. Finally, the RRC connection between the terminal device 120 and the new master TRP 2 is reconfigured, and the procedure for the role switch between the master and secondary TRPs is completed. The original master TRP 1 becomes the new secondary TRP. The value of ServCellIndex is set to 0 for the new master TRP 2.

In contrast to the master/secondary TRP role switch in FIG. 5, another feasible manner of making the TRP 2 become the master TRP is to handover the terminal device 120 from the TRP 1 to the TRP 2. However, in this manner, more operations will be involved for each entity. Table 1 below shows exemplary additional operations to be performed by each entity for handover from the TRP 1 to the TRP 2. In contrast, the role switch operation does not involve TCI state reconfiguration by using RRC signaling, and the terminal device can use existing TCI state configuration. The role switch operation does not involve MAC entity reconfiguration by the terminal device. The role switch operation does not involve TRP activation/deactivation by the terminal device or initiating random access to a cell of the new master TRP. When the original master TRP performs RRC reconfiguration on the terminal device, it is required to configure the terminal device so that the value of ServCellIndex for the cell corresponding to the original secondary TRP is set to 0. In addition, establishing Multi-TRP transmission does not need to change configuration information, such as the C-RNTI, cell ID, antenna information, downlink carrier frequency, and security algorithm of the present base station configured for the terminal device. It can be learned that the time spent in the role switch illustrated in FIG. 5 is much less than the handover delay.

TABLE 1

Exemplary operation of TRP handover

| | Terminal device | Master TRP 1 | Secondary TRP 2 |
|---|---|---|---|
| Layer 3 operation | | Reconfigure TCI state(s) on the terminal device via RRC signaling | |
| Layer 2 operation | Reconfigure the MAC entity | Before switch, configure the terminal device to deactivate the TRP 2 via MAC layer signaling | Reactivate TCI state(s) via MAC control element; After switch, configure the terminal device to reactivate the TRP 1 via MAC layer signaling |
| Layer 1 operation | Random access to the cell of the TRP 2 | | |

Figure 6:
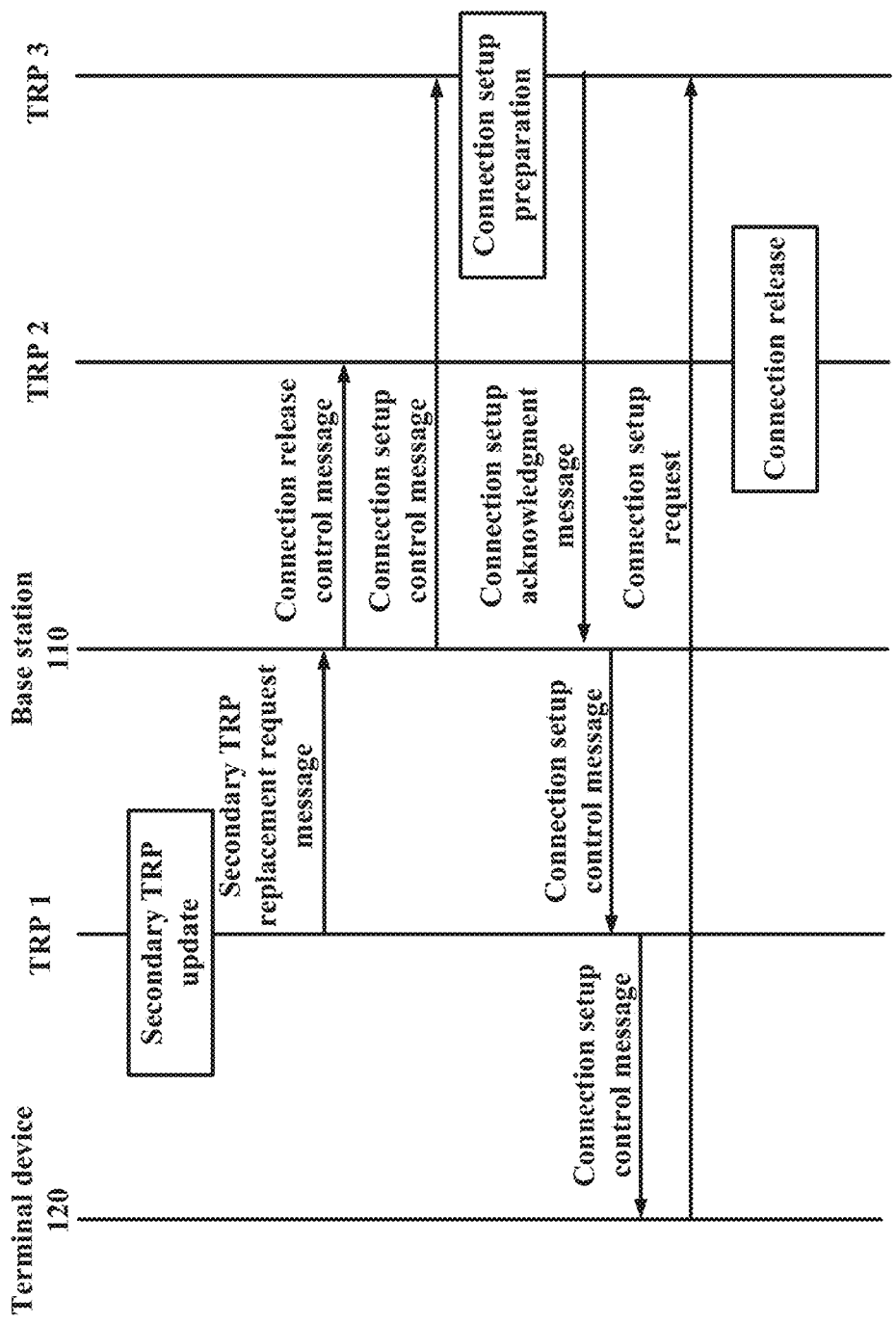

FIG. 6 illustrates an exemplary signaling flow of implementing a role switch between the master and secondary TRPs according to an embodiment. The signaling flow may be used to implement the TRP management operations illustrated in FIG. 4B. The master TRP 1, the base station 110 (for example, the TRP management units 224, 244), and the terminal device (for example, the connection management unit 264) may perform the signaling flow.

As shown in FIG. 6, in response to determining that another TRP (for example, the TRP 3) is to replace the secondary TRP 2, the master TRP 1 may send a TRP update request message to the base station 110, which is a secondary TRP replacement request message here. The base station 110 identifies that the TRP 3 is to replace the TRP 2 as the secondary TRP, in response to the secondary TRP replacement request message from the master TRP 1. Accordingly, the base station 110 sends a TRP update control message to the TRP 2, namely a connection release control message here, to instruct the TRP 2 to release a connection with the terminal device 120, and sends a connection setup control message to the TRP 3 to instruct the TRP 3, as the secondary TRP, to establish a connection with the terminal device 120.

As shown in FIG. 6, the TRP 3 may perform corresponding preparations for establishing the connection, specifically including physical layer (layer 1) preparation, in response to the connection setup control message received from the base station 110. The physical layer preparation may include preparing physical layer time-frequency resources for connecting with the terminal device 120. In a Multi-PDCCH based wireless communication system 100, the TRP 3 further needs to be ready for transmitting PDCCH signals on a corresponding control resource set and search space after becoming the secondary TRP.

As shown in FIG. 6, once the preparations for establishing the connection are completed, the TRP 3 may return a connection setup acknowledgment message to the base station 110, indicating that the TRP 3 is ready for establishing the connection with the terminal device 120. Upon receiving the connection setup acknowledgment message from the TRP 3, the base station 110 may send a TRP update acknowledgment message, namely a connection setup control message here, to the TRP 1. In an embodiment, the connection setup control message includes the TCI state configuration information of the TRP 3, so as to notify the terminal device of establishing a connection with the TRP 3. The TRP 1 then sends the connection setup control message and the TCI state configuration information of the TRP 3 to the terminal device 120.

Next, the terminal device 120 may send a connection setup request to the TRP 3 for establishing a physical layer connection between them. The terminal device 120 does not need to reconfigure the MAC entity. The TRP 2 may release the connection with the terminal device 120. Finally, the connection between the terminal device 120 and the new secondary TRP 3 is established, and the secondary TRP update procedure is completed. As a result, TRPs serving the terminal device 120 include the master TRP 1 and the secondary TRP 3.

Figure 7:
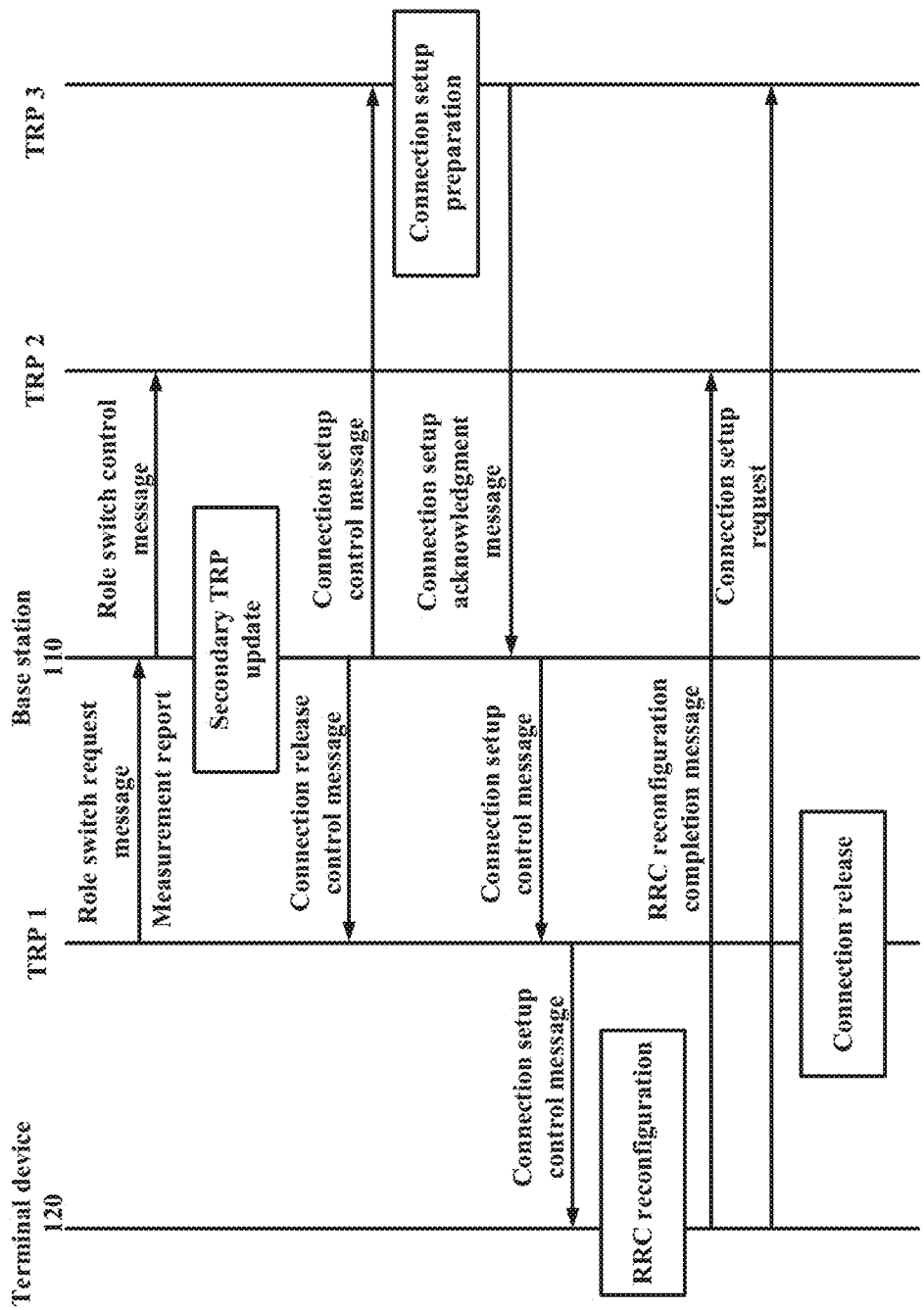

FIG. 7 illustrates an exemplary signaling flow of implementing a role switch of the master and secondary TRPs and updating the secondary TRP according to an embodiment. The signaling flow may be used to implement the TRP management operations (specifically operations 442 to 446) illustrated in FIG. 4C. TRPs, the base station 110 (for example, the TRP management unit), and a terminal device (for example, the connection management unit) may perform the signaling flow.

As shown in FIG. 7, in response to determining that master/secondary TRP roles of the TRP 1 and the TRP 2 are to be switched, the master TRP 1 sends a TRP update request message to the base station 110, which is a role switch request message here. The master TRP 1 also sends to the base station 110 a measurement report (which may be in an original or processed version) from the terminal device 120. The base station 110 identifies that the TRP 2 is to take the master TRP role in response to the role switch request message from the master TRP 1. Accordingly, the base station 110 sends a TRP update control message to the TRP 2, which is a role switch control message here. In an embodiment, the base station 110 may further send RRC connection related information of the terminal device 120 to the TRP 2, so that an RRC connection is established between the TRP 2 and the terminal device 120. Further, the base station 110 may determine that the measurement quality of the TRP 3 is better than the measurement quality of the TRP 1 (which is to become the secondary TRP previously) based on the measurement report, and determines that the TRP 3 replaces the TRP 1 as the new secondary TRP. Accordingly, the base station 110 sends a connection release control message to the TRP 1, and sends a connection setup control message to the TRP 3.

The signaling flow of role switch is omitted in FIG. 7, such signaling flow includes the following operations: the TRP 2 performs layer 2 preparation for a role switch with the TRP 1, in response to the role switch control message received from the base station 110, and returns a TRP role switch acknowledgment message to the base station 110, and the role switch acknowledgment message is further forwarded by the base station 110 to the TRP 1. The base station 110 may further send an RRC reconfiguration message to the TRP 1. Upon receiving the RRC reconfiguration message, the terminal device 120 may perform RRC reconfiguration to complete the RRC reconfiguration with the TRP 2, and the original secondary TRP 2 becomes the new master TRP. Details of the foregoing signaling flow and operations can be understood with reference to FIG. 5.

FIG. 7 shows details of the signaling flow and operations related to a secondary TRP update. As shown in FIG. 7, upon receiving the connection setup control message from the base station 110, the TRP 3 may prepare for establishing a connection with the terminal device 120. Specifically, the TRP 3 may prepare time-frequency resources for connecting with the terminal device 120. In a Multi-PDCCH based wireless communication system 100, the TRP 3 further needs to be ready for transmitting PDCCH signals on a corresponding control resource set and search space after becoming the secondary TRP. Once the preparations for establishing the connection are completed, the TRP 3 may return a connection setup acknowledgment message to the base station 110. Next, the base station 110 sends a TRP update acknowledgment message, namely a connection setup control message here, to the TRP 1 (still the master TRP). The connection setup control message includes new configuration information of the TRP 3, including corresponding new TCI state configuration information, so as to notify the terminal device of establishing a connection with the TRP 3. The TRP 1 then sends the connection setup control message and the TCI state configuration information of the TRP 3 to the terminal device 120.

As shown in FIG. 7, next, on the one hand, the terminal device 120 reconfigures an RRC connection with the TRP 2 (the new master TRP), and on the other hand, sends a connection setup request to the TRP 3 to establish a connection with the TRP 3 based on the configuration information of the TRP 3. The TRP 1 releases the connection with the terminal device 120. Finally, the RRC connection between the terminal device 120 and the new master TRP 2 is reconfigured, and the connection between the terminal device 120 and the new secondary TRP 3 is established. The original secondary TRP 2 becomes the new master TRP, the original master TRP 1 exits the TRP group, and the TRP 3 previously outside the group becomes the new secondary TRP. The value of ServCellIndex is set to 0 for the new master TRP 2.

In this example, the terminal device 120 may establish a connection with the TRP 3 while maintaining the connection with the master TRP 1 before the role switch, or may establish a connection with the TRP 3 while maintaining the connection with master TRP 2 after the role switch. Compared with general mobility management operations (such as handover), the terminal device 120 is prevented from adverse situations such as loss of a communication link, the communication quality can be ensured.

The exemplary signaling flow of TRP management according to an embodiment is described above with reference to FIGS. 5 to 7. In these figures, the sequence of signaling or operations is merely for an example, not for a limitation. Based on needs, these signaling or operations may be performed in different sequences, and more or less signaling or operations may be performed compared with those shown in the figures. Such appropriate modifications still fall within the scope of the present disclosure.

Additional Implementations of Event Report Types and TRP Management Operations

In an embodiment, in addition to event types C and B, an event type A (Event A) may also be defined based on a relative relationship between the measurement qualities of the master and secondary TRPs, or another TRP and a specified threshold. For example, within the time to trigger (TTT), if measurement quality of a TRP meets a specified threshold, the terminal device 120 may be triggered to send to the master TRP a measurement report corresponding to the time to trigger. Formulas (3) to (6) below show examples of event types A1 to A4 respectively.

$$Q_{Master\_TRP} > Q_{in} \quad \text{formula (3)}$$

$$Q_{Secondary\_TRP} > Q_{in} \quad \text{formula (4)}$$

$$Q_{Master\_TRP} < Q_{out} \quad \text{formula (5)}$$

$$Q_{Secondary\_TRP} < Q_{out} \quad \text{formula (6)}$$

where, $Q_{in}$ may be a threshold greater than or equal to $Q_{out}$. If the measurement quality of the master or secondary TRP is better than $Q_{in}$, it indicates the TRP is ideal for serving the terminal device 120. If the measurement quality of the master or secondary TRP is worse than $Q_{out}$, it indicates it is not desired for the TRP to be used for serving the terminal device 120.

In the embodiments of the present disclosure, the event types A, B, and C may be combined in an appropriate manner to trigger a measurement report. An example of a combination of the event types B and C is described above with reference to FIG. 4C, and multiple event types A can also be combined with each other or with the event type B or C. Table 2 shows some examples of combined events and TRP management operations. Those skilled in the art may similarly conceive any other suitable combined events and TRP management operations without departing from the scope of the present disclosure.

TABLE 2

Examples of combined events and TRP management operations

|  | Sub-event type | Examples of TRP management operations |
|---|---|---|
| Combined event 1 | Event A1 + Event A2 + Event C | TRP role switch |
| Combined event 2 | Event A4 + Event B | Secondary TRP replacement |
| Combined event 3 | Event A3 + Event A2 + Event C | TRP role switch |
| Combined event 4 | Event A3 + Event A4 | Switch to another TRP |

Based on the definitions of various event types, it can be understood from Table 2 that: a combined event 1 indicates that the measurement qualities of both the master TRP and the secondary TRP are good (higher than a expected threshold $Q_{in}$) and the measurement quality of the secondary TRP is better than the measurement quality of the master TRP. A corresponding TRP management operation may be switching the roles of the master and secondary TRPs.

It can be understood from Table 2 that: a combined event 2 indicates that the measurement quality of the secondary TRP is lower than an expected threshold (for example, $Q_{out}$) and the measurement quality of another TRP is better than the measurement quality of the secondary TRP. A corresponding TRP management operation may be replacing the secondary TRP with the another TRP.

It can be understood from Table 2 that: a combined event 3 indicates that the measurement quality of the secondary TRP is good, the measurement quality of the master TRP is lower than an expected threshold (for example, $Q_{out}$), and the measurement quality of the secondary TRP is better than the measurement quality of the master TRP. A corresponding TRP management operation may be switching the roles of the master and secondary TRPs. In this case, another TRP may replace the original master TRP as the secondary TRP, as described above with reference to operations 442 to 446.

It can be understood from Table 2 that: a combined event 4 indicates that the measurement qualities of the master and secondary TRPs are both lower than an expected threshold (for example, $Q_{out}$). In this case, if the measurement quality of another TRP is better than the expected threshold, the corresponding TRP management operation may be handover from the master TRP to the another TRP.

Figure 8:
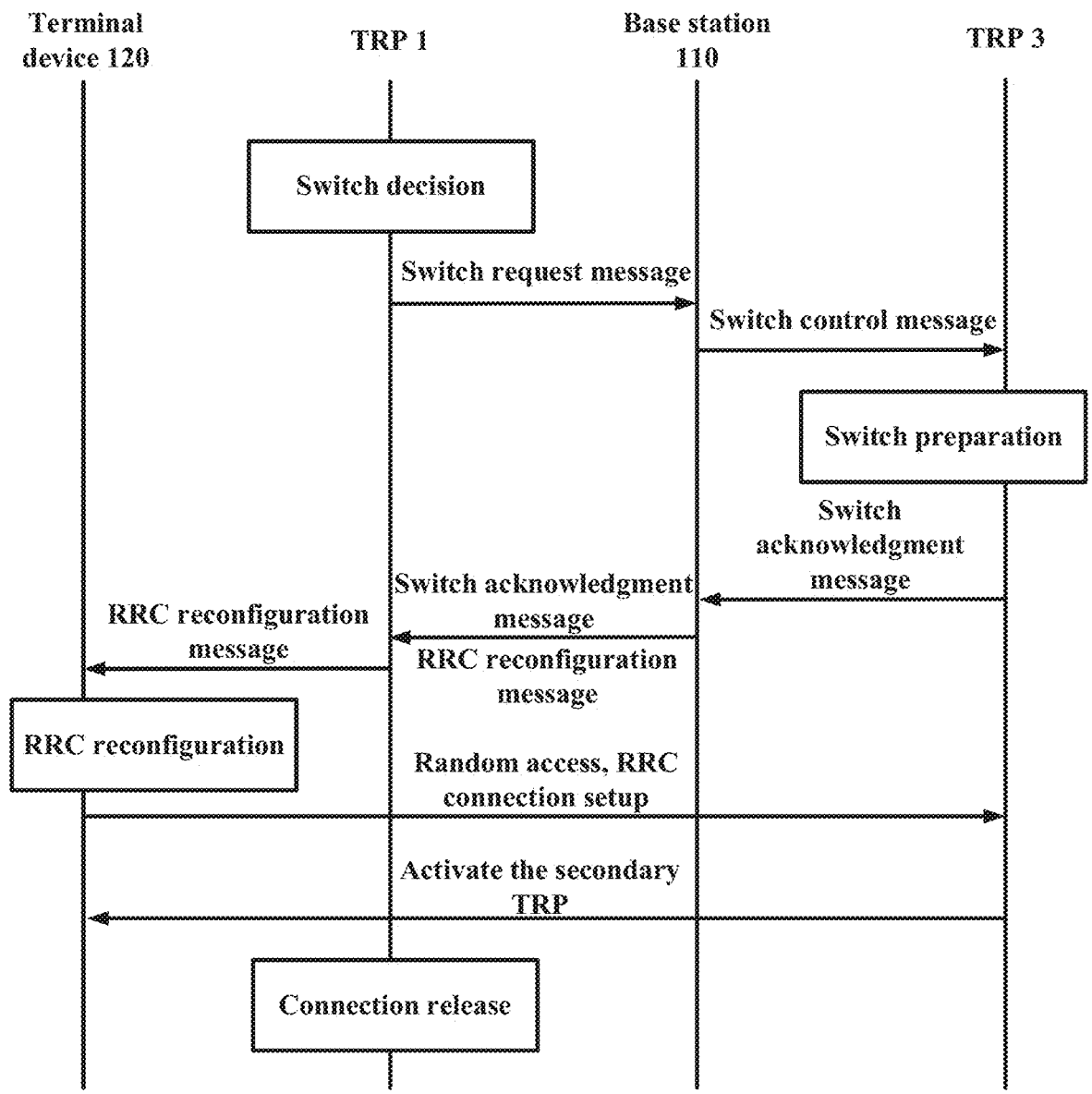

An exemplary signaling flow of TRP role switch and secondary TRP replacement has been described with reference to FIGS. 5 to 7, and the description therefore is not repeated herein. FIG. 8 illustrates an exemplary signaling flow of implementing TRP handover according to an embodiment. The master TRP 1, the base station 110 (for example, the TRP management units 224, 244), and the terminal device (for example, the connection management unit 264) may perform the signaling flow.

As shown in FIG. 8, the master TRP 1 sends a switch request message to the base station 110 in response to determining that the terminal device 120 is to switch from the master TRP 1 to another TRP (for example, the TRP 3). The switch request message may include information required by the TRP 3 for layer 1/layer 2 preparation for a switch. The base station 110 identifies that the new TRP 3 is to take the master TRP role for the terminal device 120, in response to receiving the switch request message from the master TRP 1. Accordingly, the base station 110 sends a switch control message to the TRP 3. In an embodiment, the base station 110 may further send RRC connection related information of the terminal device 120 to the TRP 3, so that an RRC connection is established between the TRP 3 and the terminal device 120.

As shown in FIG. 8, the TRP 3 may perform layer 1/layer 2 preparation for a switch, in response to receiving the switch control message from the base station 110. Specifically, the layer 1 preparation may include allocating physical layer time-frequency frequencies for establishing a connection with the terminal device 120; and the layer 2 preparation may include establishing a MAC entity, or the layer 2 preparation may further include establishing an RLC entity and even establishing a PDCP entity. The TRP 3 further needs to be ready for transmitting PDCCH signals on a corresponding control resource set and search space after becoming the master TRP.

As shown in FIG. 8, once the switch preparation is completed, the TRP 3 may return a switch acknowledgment message to the base station 110, indicating that the TRP 3 is ready for the role switch. Upon receiving the switch acknowledgment message from the TRP 3, the base station 110 may forward the switch acknowledgment message to the TRP 1. The base station 110 may further send an RRC reconfiguration message to the TRP 1, so that the terminal device 120 can handover to a cell of the new master TRP 3 and establish an RRC connection. In an embodiment, the base station 110 also sends TCI state configuration information of the TRP 3 to the TRP 1, so as to notify the terminal device to establish a connection with the TRP 3. The TRP 1 then sends the foregoing information to the terminal device 120.

As shown in FIG. 8, upon receiving the RRC reconfiguration message, the terminal device 120 may initiate a random access procedure to a cell of the TRP 3 and perform RRC reconfiguration. Specifically, the terminal device 120 needs to reconfigure its own MAC entity and establishes RRC communication with the new master TRP 3 by using the TCI state configuration information of the TRP 3.

Upon completion of the RRC reconfiguration, the terminal device 120 may send an RRC reconfiguration completion message to the TRP 3. Finally, the terminal device 120 is handed over from the TRP 1 to the new master TRP 3.

In the disclosure, members in a TRP group serving a terminal device are updated in manners such as switching roles of the master and secondary TRPs and replacing the secondary TRP, which can ensure reliability of a communication link between the terminal device and the master TRP, avoid or delay TRP handover to the greatest extent, and reduce TRP management related delays. This is beneficial to URLLC services.

In high frequency bands such as the FR2 frequency band in the NR system, beams are narrow and cell coverage is small, so communication links between terminal devices and TRPs are prone to movement of the terminal devices. In such frequency bands, the TRP group updating scheme according to the present disclosure can give full play to its advantages in avoiding or delaying TRP handover. In particular, for URLLC services deployed in the FR2 high frequency band, the scheme according to the present disclosure can guarantee high communication reliability and low transmission delay while maintaining transmission at high data rates.

Example of Control Signaling

As described with reference to FIG. 1, in a Multi-PDCCH based Multi-TRP communication system, the master and secondary TRPs can send downlink control channels (for example, PDCCHs) individually in corresponding control resource sets and search spaces; and in a Single-PDCCH based Multi-TRP communication system, only the master TRP can send downlink control channels (for example, PDCCHs) in its control resource set and search space. In an embodiment, the master TRP can configure corresponding control resource sets and search spaces for the master and secondary TRPs. A control resource set can be assigned a corresponding identification index, and the identification index can be referred to as CORESETPoolIndex. For example, the master TRP may correspond to a control resource set with a CORESETPoolIndex value of 0, and the secondary TRP may correspond to a control resource set with a CORESETPoolIndex value of 1. The master TRP may also send control channel indicator information to the terminal device 120 to instruct receiving a downlink control channel (for example, a PDCCH) in a corresponding control resource set and search space via at least one of the master TRP or the secondary TRP. The master TRP may also use at least one of an RRC signaling, a MAC control element (CE), downlink control information (DCI), or the like to carry the control channel indication information.

FIG. 9A illustrates an exemplary MAC control element used to carry control channel indication information according to an embodiment. The MAC control element includes the following fields.

Field 1: $C_i$ corresponding to a different CORESETPoolIndex. This field indicates an activated/deactivated state of the control resource set corresponding to the CORESETPoolIndex with a value of i, the length of this field is 1 bit.

If $C_0=0$ and $C_1=1$, it indicates that the control resource set corresponding to the CORESETPoolIndex with a value of 0 is in the deactivated state and the control resource set corresponding to the CORESETPoolIndex with a value of 1 is in the activated state. Correspondingly, the terminal device receives and decodes PDCCHs by using the control resource set corresponding to the CORESETPoolIndex with a value of 1. If $C_0=1$ and $C_1=0$, it indicates that the control resource set corresponding to the CORESETPoolIndex with a value of 0 is in the activated state and the control resource set corresponding to the CORESETPoolIndex with a value of 1 is in the deactivated state, a UE receives and decodes PDCCHs by using the control resource set corresponding to the CORESETPoolIndex with a value of 0. In the two cases above, the control resource set of either the master or secondary TRPs is in the activated state for PDCCH signals transmission, so the two cases correspond to the Single-PDCCH scenario.

If $C_0=1$ and $C_1=1$, it indicates that the control resource sets corresponding to the CORESETPoolIndex with values of 0 and 1 are all in the activated state, and the terminal device can receive and decode PDCCHs by using both control resource sets. In this case, the control resource sets of both the master and secondary TRPs are in the activated state for PDCCH signals transmission, so this case corresponds to the Multi-PDCCH scenario. That is, in the embodiments, the Multi-PDCCH and Single-PDCCH states of the communication system can be reflected by the values of CORESETPoolIndex corresponding to different TRPs.

Field 2: serving cell ID. This field may indicate the identity of a serving cell to which the MAC control element is applied, and the length of the field is, for example, 5 bits.

Field 3: BWP ID. This field may indicate the identity of a carrier bandwidth part to which the MAC control element is applied, and the length of the field is, for example, 2 bits.

FIG. 9B illustrates an exemplary MAC control element used to carry a TCI state configuration indicator according to an embodiment. The MAC control element can be used to notify the terminal device 120 of TCI state configuration for receiving PDCCHs.

As shown in FIG. 9B, the MAC control element may include the serving cell ID, control resource set ID, and TCI state ID. The serving cell ID field may indicate the identity of a serving cell to which the MAC control element is applied, and the length of the field is, for example, 5 bits. The control resource set ID field may indicate a corresponding control resource set, and the length of the field is, for example, 4 bits. The TCI state ID field may indicate a corresponding TCI state, and the length of the field is, for example, 7 bits. The TCI state applies to the control resource set indicated by the control resource set ID.

FIG. 10 illustrates an exemplary method for a Multi-TRP wireless communication system according to an embodiment. The method 1000 may be performed by a first TRP, where the first TRP and a second TRP jointly serve a particular terminal device. As shown in FIG. 10, in response to that the first TRP and the second TRP are a master TRP and a secondary TRP respectively serving the terminal device, the method 1000 includes: providing measurement configuration information to the terminal device, where the measurement configuration information specifies at least the first TRP and the second TRP are to be measured (block 1005); receiving a measurement report from the terminal device, where the measurement report comprises measurement qualities of at least the first TRP and the second TRP (block 1010); and updating TRPs serving the particular terminal device based at least on measurement qualities of the first TRP and the second TRP. In an embodiment, updating TRPs serving the particular terminal device includes determining that the second TRP is to become the master TRP serving the terminal device based on that a relative relationship between the measurement qualities of the first TRP and the second TRP meets a first threshold.

In an embodiment, updating TRPs serving the particular terminal device further includes: determining that a third TRP is to replace the second TRP to serve the terminal device based on that the measurement quality of the second TRP is lower than a second threshold and the measurement quality of the third TRP is better than the measurement quality of the second TRP.

In an embodiment, the method further includes sending a corresponding TRP update request message to a base station based on updating TRPs serving the particular terminal device. The update request message includes one of the following: the second TRP is to become the master TRP serving the terminal device; or the third TRP is to replace the first TRP and become the secondary TRP serving the terminal device.

In an embodiment, the method further includes receiving a TRP update acknowledgment message from the base station. The acknowledgment message indicates at least one of the following: the second TRP is to become the master TRP serving the terminal device and the first TRP is to become the secondary TRP serving the terminal device; the third TRP is to replace the second TRP and become the secondary TRP serving the terminal device; or the second TRP is to become the master TRP serving the terminal device, and the third TRP is to replace the first TRP and become the secondary TRP serving the terminal device.

In an embodiment, the method further includes sending a radio resource control (RRC) reconfiguration message to the terminal device, so as to instruct the terminal device to perform at least one of the following: establishing a master connection with the second TRP, and establishing a secondary connection with the first TRP; establishing a secondary connection with the third TRP; or establishing a master connection with the second TRP, and establishing a secondary connection with the third TRP.

In an embodiment, the method further includes: in response to that the first TRP is the secondary TRP serving the terminal device, receiving a TRP update control message from the base station and performing the following operations: in response to the update control message indicating that the first TRP is to become the master TRP for the terminal device, preparing layer 2 resources, and sending a TRP update acknowledgment message to the base station; or in response to the update control message indicating that the first TRP no longer serves the terminal device, releasing a connection with the terminal device.

FIG. 11A illustrates another exemplary method for a Multi-TRP wireless communication system according to an embodiment. The method 1100 may be performed by a base station, and the base station controls multiple TRPs to jointly serve a particular terminal device. As shown in FIG. 11A, in response to that a first TRP and a second TRP are a master TRP and a secondary TRP respectively serving a terminal device, the method includes: providing to the first TRP with measurement configuration information for the terminal device, where the measurement configuration information specifies that the terminal device performs measurement on at least the first TRP and the second TRP (block 1105); and receiving a first update request message from the first TRP, where the first update request message indicates that the second TRP is to become the master TRP serving the terminal device and the first TRP is to become the secondary TRP serving the terminal device (block 1110).

In an embodiment, the method further includes sending a control message to the second TRP to indicate that the second TRP is to become the master TRP serving the terminal device.

In an embodiment, the method further includes: receiving a measurement report of the terminal device from the first TRP, where the measurement report comprises measurement qualities of respective TRPs; and determining that a third TRP is to become the secondary TRP serving the terminal device based on that the measurement quality of the first TRP is lower than a third threshold and the measurement quality of the third TRP is better than the measurement quality of the first TRP.

In an embodiment, the method further includes: sending a control message to the first TRP to indicate that the first TRP no longer serves the terminal device; sending a control message to the second TRP to indicate that the second TRP is to become the master TRP serving the terminal device; and sending a control message to the third TRP to indicate that the third TRP is to become the secondary TRP serving the terminal device.

In an embodiment, the method further includes receiving a second update request message from the first TRP, where the second update request message indicates that the third TRP is to replace the second TRP and become the secondary TRP serving the terminal device.

In an embodiment, the method further includes: sending a control message to the second TRP to indicate that the second TRP no longer serves the terminal device; and sending a control message to the third TRP to indicate that the third TRP is to become the secondary TRP serving the terminal device.

In an embodiment, the method further includes sending to the first TRP an acknowledgment message for the first or the second update request message.

FIG. 11B illustrates still another exemplary method for a Multi-TRP wireless communication system according to an embodiment. The method 1150 may be performed by a terminal device, and the terminal device is served by a first TRP and a second TRP jointly, the first TRP is a master TRP and the second TRP is a secondary TRP. The method includes: measuring the first TRP and the second TRP based on measurement configuration information received from the first TRP (block 1155); and sending a measurement report to the first TRP based on that a relative relationship between measurement qualities of the first TRP and the second TRP meets a first threshold, where the measurement report includes measurement qualities of at least the first TRP and the second TRP (block 1160).

In an embodiment, the method further includes measuring a third TRP based on the measurement configuration information, and the measurement report further includes the measurement quality of the third TRP.

In an embodiment, the method further includes receiving a radio resource control (RRC) reconfiguration message from the master TRP and performing at least one of the following: establishing a master connection with the second TRP, and establishing a secondary connection with the first TRP; establishing a secondary connection with the third TRP; or establishing a master connection with the second TRP, and establishing a secondary connection with the third TRP.

The foregoing methods 1000 to 1150 can be understood with reference to FIGS. 4A to 9B. For example, referring to a flow of signaling in the signaling flowchart, those skilled in the art can clearly understand a mapping between each signaling and each operation in the methods 1000 to 1150. Details are not described herein again.

The following describes an exemplary satellite communication scenario, in which a technical solution according to an embodiment of the present disclosure can be applied.

As known, satellite communication has advantages in terms of coverage, reliability, and flexibility The integration of satellite communications and terrestrial mobile networks helps deliver a more reliable consistent service experience, reduce network deployment costs, and develop an integrated ubiquitous network pattern. Therefore, non-terrestrial networks (NTNs) communication and its integration with terrestrial mobile networks have become important application scenarios in the communications field.

Figure 12A:
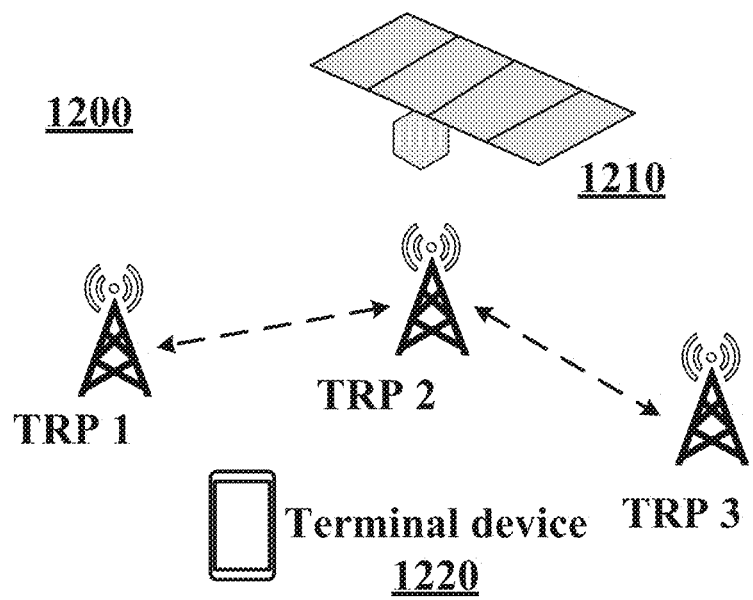
FIG. 12A and FIG. 12B illustrate an exemplary satellite communication scenario of a solution according to an embodiment of the present disclosure.

In the satellite communication scenario illustrated in FIG. 12A, the wireless communication system 1200 includes a satellite 1210, TRP 1 to TRP 3, and a terminal device 1220. The satellite 1210 and each of the TRPs can be configured to be coupled to each other through a wireless link, and each TRP can be used as an Ancillary Terrestrial Component (ATC) of the satellite 1210 to improve the coverage performance of the satellite 1210. Alternatively, TRPs can also be provided in the air, for example, to be implemented as a drone with a TRP function, which can be flexibly deployed with satellites in emergencies such as natural disasters and wars that cause damage to terrestrial infrastructure. The TRP 1 and the TRP 2 may be configured to communicate with the terminal device 1220 via wireless links to form a multi-TRP system serving the terminal device 1220. Specifically, the TRP 1 may be a master TRP serving the terminal device 1220, and the TRP 2 may be a secondary TRP serving the terminal device 1220.

In an embodiment, the satellite 1210 may include any type of orbiting satellite, such as a Geostationary Orbit Satellite (GEO), a Medium Orbit Satellite (MEO), a Low Orbit Satellite (LEO). In the present disclosure, the terms satellite and satellite communication device can be used interchangeably unless the context clearly dictates otherwise. The satellite 1210 may correspond to the base station in FIG. 1. In a case where the terminal device is mobile, each TRP can perform various operations according to the present disclosure, such as switch of the master and secondary TRPs or replacement of the secondary TRP, to provide services for the terminal device.

Figure 12B:
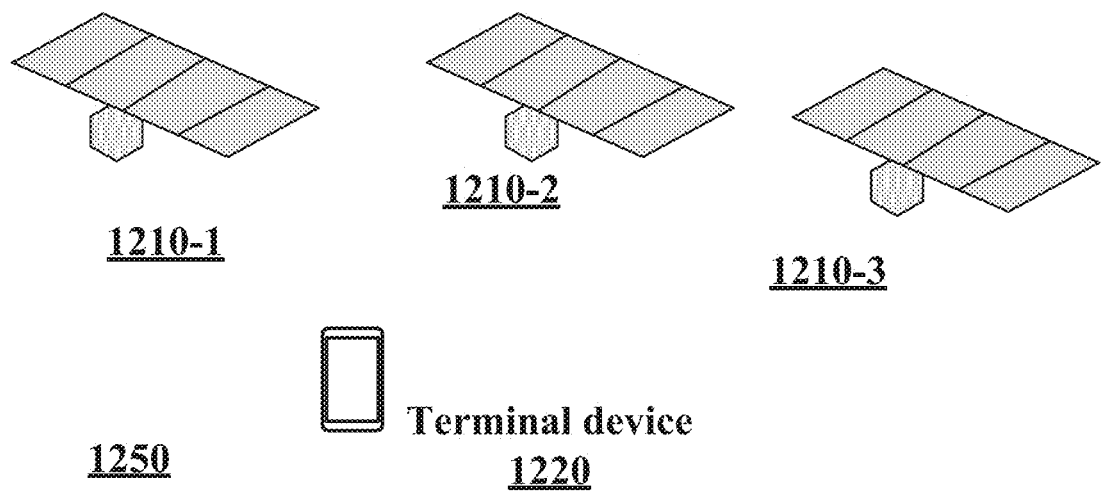

In the satellite communication scenario illustrated in FIG. 12B, the wireless communication system 1250 includes satellites 1210-1 to 1210-3 and a terminal device 1220. Each of the satellites 1210-1 to 1210-3 may be located in low orbit to provide coverage for the terminal device. For example, each satellite may use the beamforming technology to communicate with the terminal device. In an embodiment, multiple satellites may be used as TRPs to serve the terminal device 1220 at the same time, and the multiple satellites can form a multi-TRP system serving the terminal device 1220. For example, the satellite 1210-1 may be a master TRP serving the terminal device 1220, and the satellite 1210-2 may be a secondary TRP serving the terminal device 1220. In an embodiment, the satellite 1210-1 or 1210-2 itself, another satellite, or a device coupled to the satellites 1210-1 and 1210-2 may correspond to the base station in FIG. 1.

The satellites 1210-1 to 1210-3 may include low-orbit satellites. In an embodiment, both the low-orbit satellites and the terminal device may be mobile. It is generally considered that operations of mobility management are caused by the movement of low-orbit satellites in the air, unless the terminal device moves at an extremely high speed. In this case, each satellite can perform various operations according to the present disclosure, such as switch of the master and secondary TRPs or replacement of the secondary TRP, to provide services for the terminal device.

Specifically, assuming that the satellites in FIG. 12B move from right to left in the figure, at a first point of time, the satellite 1210-1 and the satellite 1210-2 form a multi-TRP system serving the terminal device 1220, in which the satellite 1210-1 is the master TRP, and the satellite 1210-2 is the secondary TRP. At a second point of time, a relative relationship between measurement qualities of the satellite 1210-1 and the satellite 1210-2 meets a threshold of the relationship due to movement. At this point of time, the satellite 1210-2 becomes the master TRP, and the satellite 1210-1 becomes the secondary TRP by switching the roles of the master and secondary TRPs. At a third point of time, the relative relationship between the measurement qualities of the satellite 1210-1 and the satellite 1210-3 meets a threshold of the relationship due to movement. At this point of time, the satellite 1210-3 replaces the satellite 1210-1 and takes the role of the secondary TRP, and serves the terminal device 1220 jointly with the master TRP (the satellite 1210-2). Next, the roles of the master and secondary TRPs may be switched similarly between the satellite 1210-3 and the satellite 1210-2, and another satellite (not shown) may be added to perform an operation of switching the master and secondary TRPs or replacing the secondary TRP.

Various exemplary electronic devices and methods according to the embodiments of the present disclosure have been described above. It should be understood that the operations or functions of these electronic devices may be combined with each other to achieve more or less operations or functions than described. The operation steps of the methods may also be combined with each other in any appropriate order, so that more or fewer operations are similarly achieved than described.

It should be understood that the machine-executable instructions in the machine-readable storage medium or program product according to the embodiments of the present disclosure may be configured to perform operations corresponding to the device and method embodiments described above. When referring to the above device and method embodiments, the embodiments of the machine-readable storage medium or the program product are clear to those skilled in the art, and therefore description thereof will not be described herein again. A machine-readable storage media and a program product for carrying or including the above-described machine-executable instructions also fall within the scope of the present disclosure. Such storage medium can include, but is not limited to, a floppy disk, an optical disk, a magneto-optical disk, a memory card, a memory stick, and the like. In addition, it should be understood that the foregoing series of processing and devices may alternatively be implemented by software and/or firmware.

Figure 13:
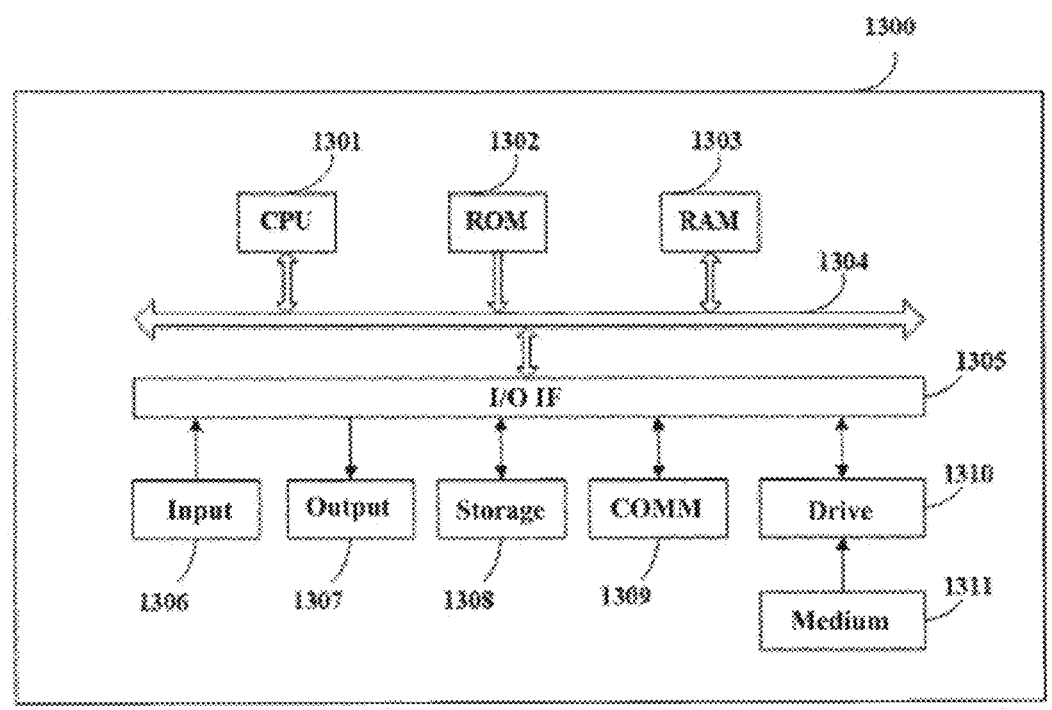
FIG. 13 is a block diagram illustrating an exemplary structure of a personal computer as an information processing device that can be used in an embodiment of the present disclosure.

In addition, it should be understood that the foregoing series of processing and devices may alternatively be implemented by software and/or firmware. In the case that the processing and devices are implemented by software and/or firmware, a program constituting the software is installed from a storage medium or a network to a computer with a dedicated hardware structure, for example, a universal personal computer 1300 shown in FIG. 13. When installed with various programs, the computer can perform various functions. FIG. 13 is a block diagram illustrating an exemplary structure of a personal computer as an information processing device that can be used in an embodiment of the present disclosure. In an example, the personal computer may correspond to the foregoing exemplary terminal device according to the present disclosure.

In FIG. 13, a central processing unit (CPU) 1301 executes various processing based on a program stored in a read-only memory (ROM) 1302 or a program loaded from a storage part 1308 to a random access memory (RAM) 1303. The RAM 1303 also stores data required for the CPU 1301 to execute various processing and the like when necessary.

The CPU 1301, the ROM 1302, and the RAM 1303 are connected with each other via a bus 1304. An input/output port 1305 is also connected to the bus 1304.

The following components are connected to the input/output port 1305: an input part 1306, including a keyboard, a mouse, and the like; an output part 1307, including a display such as a cathode-ray tube (CRT) and a liquid crystal display (LCD), a speaker, and the like; a storage part 1308, including a hard disk and the like; and a communication part 1309, including a network interface card such as a LAN card, a modem, and the like. The communication part 1309 performs communication processing via a network such as the Internet.

Based on needs, a drive 1310 is also connected to the input/output port 1305. A removable medium 1311 such as a magnetic disk, an optical disk, a magneto-optical disk, a semiconductor memory, or the like is mounted on the drive 1310 when necessary, so that a computer program read therefrom is installed in the storage part 1308 when necessary.

In the case that the foregoing series of processing are implemented by software, programs constituting the software are installed from a network such as the Internet or a storage medium such as the removable medium 1311.

Those skilled in the art should understand that such a storage medium is not limited to the removable medium 1311 shown in FIG. 13, in which the program is stored and distributed independent from a device to provide the program for users. For example, the removable medium 1311 includes a magnetic disk (including a floppy disk (registered trademark)), an optical disk (including a compact disk read-only memory (CD-ROM) and a digital versatile disk (DVD)), a magneto-optical disk (including a mini disk (MD)(registered trademark)), and a semiconductor memory. Alternatively, the storage medium may be the ROM 1302, a hard disk included in the storage part 1308, or the like, in which the program is stored, and will be distributed to users together with a device including it.

The technology of the present disclosure can be applied to various products. For example, the base stations mentioned in this disclosure may be implemented as any type of evolved Node B (gNB), such as a macro gNB and a small gNB. The small gNB may be a gNB covering a cell smaller than the macro cell, such as a pico gNB, a micro gNB, and a home (femto) gNB. Alternatively, the base station may be implemented as any other type of base station, such as a NodeB and a Base Transceiver Station (BTS). The base station may include: a body (also referred to as a base station device) configured to control radio communication; and one or more remote radio heads (RRHs) disposed at a different location from the body. In addition, various types of terminals which will be described below can operate as a base station independently by performing base station functions temporarily or semi-persistently.

For example, the terminal device mentioned in the present disclosure, also referred to as user equipment in some examples, may be implemented as a mobile terminal (such as a smartphone, a tablet personal computer (PC), a notebook PC, a portable game terminal, a portable/dongle type mobile router and a digital camera), or an in-vehicle terminal (such as a car navigation device). The user equipment may also be implemented as a terminal that performs machine-to-machine (M2M) communication (also referred to as a machine type communication (MTC) terminal). Further, the user equipment may be a radio communication module (such as an integrated circuit module including a single wafer) installed on each of the foregoing terminals.

Use cases according to the present disclosure will be described below with reference to FIGS. 14 to 17.

Use Cases Regarding a Base Station

An exemplary configuration of a gNB is described below with reference to FIG. 14 and FIG. 15. It can be understood that a TRP may have configuration similar to a gNB. Alternatively, a TRP may only have the transmission and reception function in the figures, have some layer 2 or layer 3 control functions, and even have functions that are completely or basically the same as a gNB.

First Use Case

Figure 14:
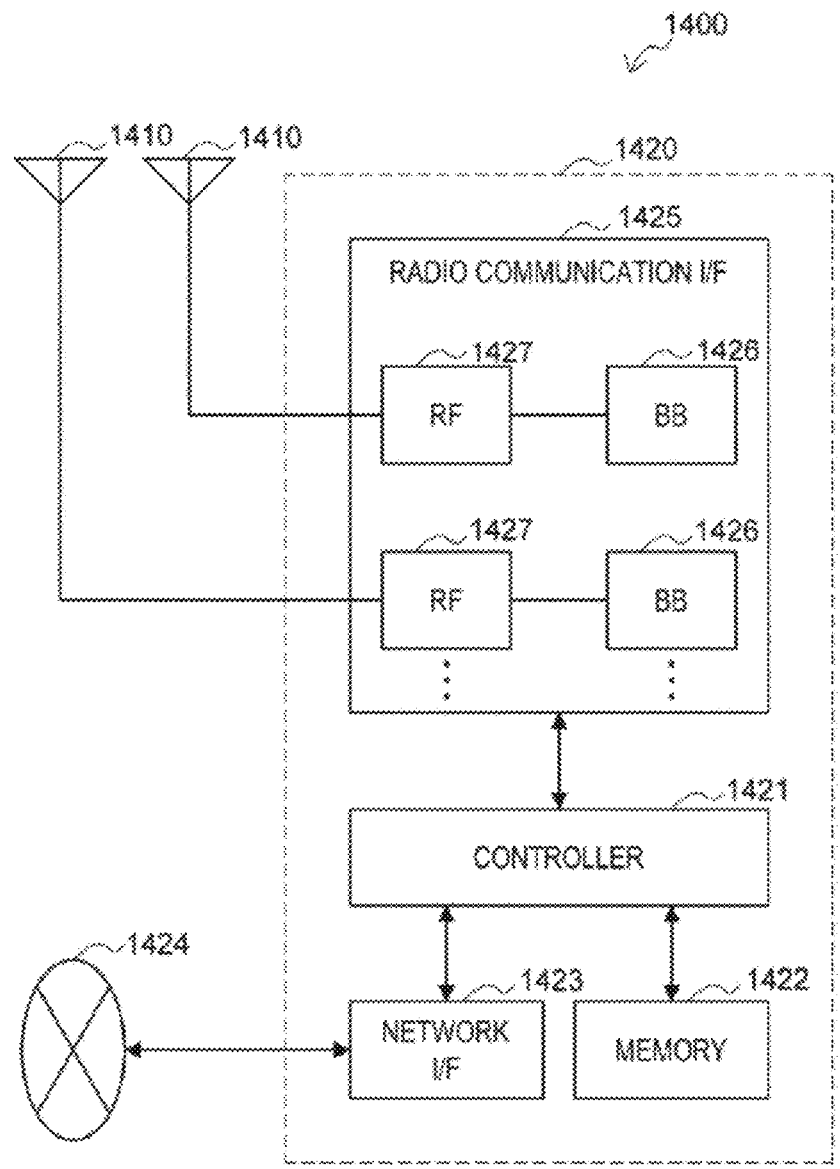
FIG. 14 is a block diagram illustrating a first example of a schematic configuration of a gNB to which the technology of the present disclosure can be applied.

FIG. 14 is a block diagram illustrating a first example of a schematic configuration of a gNB to which the technology of the present disclosure can be applied. A gNB 1400 includes multiple antennas 1410 and a base station device 1420. The base station device 1420 and each of the antennas 1410 may be connected to each other via an RF cable. In one implementation, the gNB 1400 (or the base station device 1420) herein may correspond to the electronic devices 300A, 1300A, and/or 1500B described above.

Each of the antennas 1410 includes one or more antenna elements (such as multiple antenna elements included in a multiple input and multiple output (MIMO) antenna), and is used for the base station device 1420 to transmit and receive radio signals. As shown in FIG. 14, the gNB 1400 may include multiple antennas 1410. For example, multiple antennas 1410 may be compatible with multiple frequency bands used by the gNB 1400.

The base station device 1420 includes a controller 1421, a memory 1422, a network interface 1423, and a radio communication interface 1425.

The controller 1421 may be, for example, a CPU or a DSP, and operates various functions of higher layers of the base station device 1420. For example, the controller 1421 generates data packets based on data in signals processed by the radio communication interface 1425, and transfers the generated packets via the network interface 1423. The controller 1421 can bundle data from multiple baseband processors to generate bundled packets, and transfer the generated bundled packets. The controller 1421 may have logic functions of performing control such as radio resource control, radio bearer control, mobility management, admission control, and scheduling. Such control may be performed in corporation with a gNB or a core network node in the vicinity. The memory 1422 includes a RAM and a ROM, and stores a program that is executed by the controller 1421 and various types of control data (such as a terminal list, transmission power data, and scheduling data).

The network interface 1423 is a communication interface for connecting the base station device 1420 to a core network 1424. The controller 1421 may communicate with a core network node or another gNB via the network interface 1423. In this case, the gNB 1400 and the core network node or the another gNB may be connected to each other through a logical interface (such as an Si interface and an X2 interface). The network interface 1423 may alternatively be a wired communication interface or a radio communication interface for radio backhaul lines. If the network interface 1423 is a radio communication interface, the network interface 1423 may use a higher frequency band for radio communication than a frequency band used by the radio communication interface 1425.

The radio communication interface 1425 supports any cellular communication schemes (such as Long Term Evolution (LTE) and LTE-Advanced), and provides, via the antenna 1410, wireless connection to a terminal located in a cell of the gNB 1400. The radio communication interface 1425 may typically include, for example, a baseband (BB) processor 1426 and an RF circuit 1427. The BB processor 1426 may perform, for example, encoding/decoding, modulation/demodulation, and multiplexing/demultiplexing, and performs various types of signal processing of layers (such as L1, Medium Access Control (MAC), Radio Link Control (RLC), and Packet Data Convergence Protocol (PDCP)). In place of the controller 1421, the BB processor 1426 may have a part or all of the above-described logic functions. The BB processor 1426 may be a memory that stores a communication control program, or a module that includes a processor configured to execute the program and a related circuit. Updating the program may change the functions of the BB processor 1426. The module may be a card or a blade that is inserted into a slot of the base station device 1420. Alternatively, the module may also be a chip that is mounted on the card or the blade. In addition, the RF circuit 1427 may include, for example, a mixer, a filter, and an amplifier, and transmits and receives radio signals via the antenna 1410. Although FIG. 14 illustrates an example in which one RF circuit 1427 is connected to one antenna 1410, the present disclosure is not limited thereto; rather, one RF circuit 1427 may be connected to a plurality of antennas 1410 at the same time.

As shown in FIG. 14, the radio communication interface 1425 may include multiple BB processors 1426. For example, the multiple BB processors 1426 may be compatible with multiple frequency bands used by the gNB 1400. As shown in FIG. 14, the radio communication interface 1425 may include multiple RF circuits 1427. For example, the multiple RF circuits 1427 may be compatible with multiple antenna elements. Although FIG. 14 illustrates an example in which the radio communication interface 1425 includes multiple BB processors 1426 and multiple RF circuits 1427, the radio communication interface 1425 may alternatively include a single BB processor 1426 or a single RF circuit 1427.

Second Use Case

Figure 15:
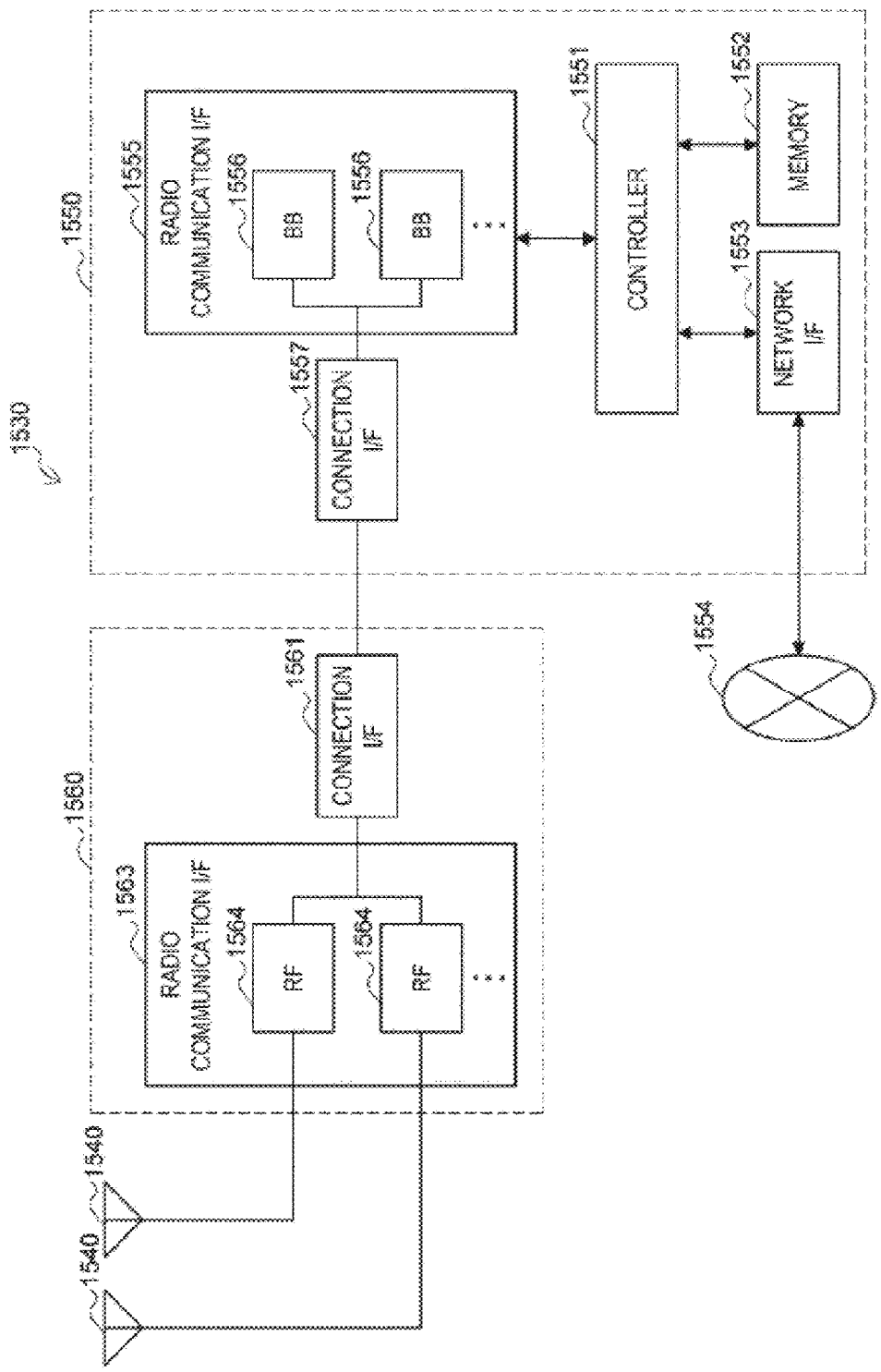
FIG. 15 is a block diagram illustrating a second example of a schematic configuration of a gNB to which the technology of the present disclosure can be applied.

FIG. 15 is a block diagram illustrating a second example of a schematic configuration of a gNB to which the technology of the present disclosure can be applied. A gNB 1530 includes multiple antennas 1540, a base station device 1550, and a RRH 1560. The RRH 1560 and each of the antennas 1540 may be connected to each other via an RF cable. The base station device 1550 and the RRH 1560 may be connected to each other via a high speed line such as a fiber optic cable. In one implementation, the gNB 1530 (or the base station device 1550) herein may correspond to the electronic devices 300A, 1300A, and/or 1500B described above.

Each of the antennas 1540 includes one or more antenna elements (such as multiple antenna elements included in a MIMO antenna), and is used for the RRH 1560 to transmit and receive radio signals. As shown in FIG. 15, the gNB 1530 may include multiple antennas 1540. For example, multiple antennas 1540 may be compatible with multiple frequency bands used by the gNB 1530.

The base station device 1550 includes a controller 1551, a memory 1552, a network interface 1553, a radio communication interface 1555, and a connection interface 1557.

The controller 1551, the memory 1552, and the network interface 1553 are the same as the controller 1421, the memory 1422, and the network interface 1423 described with reference to FIG. 14.

The radio communication interface 1555 supports any cellular communication scheme (such as LTE, LTE-Advanced, and NR) and provides radio communication to terminals located in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 14, except that the BB processor 1556 is connected to an RF circuit 1564 of the RRH 1560 via the connection interface 1557. As shown in FIG. 15, the radio communication interface 1555 may include multiple BB processors 1556. For example, the multiple BB processors 1556 may be compatible with multiple frequency bands used by the gNB 1530. Although FIG. 15 illustrates an example in which the radio communication interface 1555 includes multiple BB processors 1556, the radio communication interface 1555 may alternatively include a single BB processor 1556.

The connection interface 1557 is an interface for connecting the base station device 1550 (radio communication interface 1555) to the RRH 1560. The connection interface 1557 may further be a communication module for communication in the above-described high speed line that connects the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may further be a communication module for communication in the above-described high speed line.

The radio communication interface 1563 transmits and receives radio signals via the antenna 1540. The radio communication interface 1563 may typically include, for example, an RF circuit 1564. The RF circuit 1564 may include, for example, a mixer, a filter, and an amplifier, and transmits and receives radio signals via the antenna 1540. Although FIG. 15 illustrates an example in which one RF circuit 1564 is connected to one antenna 1540, the present disclosure is not limited thereto; rather, one RF circuit 1564 may be connected to a plurality of antennas 1540 at the same time.

As shown in FIG. 15, the radio communication interface 1563 may include multiple RF circuits 1564. For example, the multiple RF circuits 1564 may support multiple antenna elements. Although FIG. 15 illustrates an example in which the radio communication interface 1563 includes multiple RF circuits 1564, the radio communication interface 1563 may alternatively include a single RF circuit 1564.

Use Cases Regarding User Equipment

First Use Case

Figure 16:
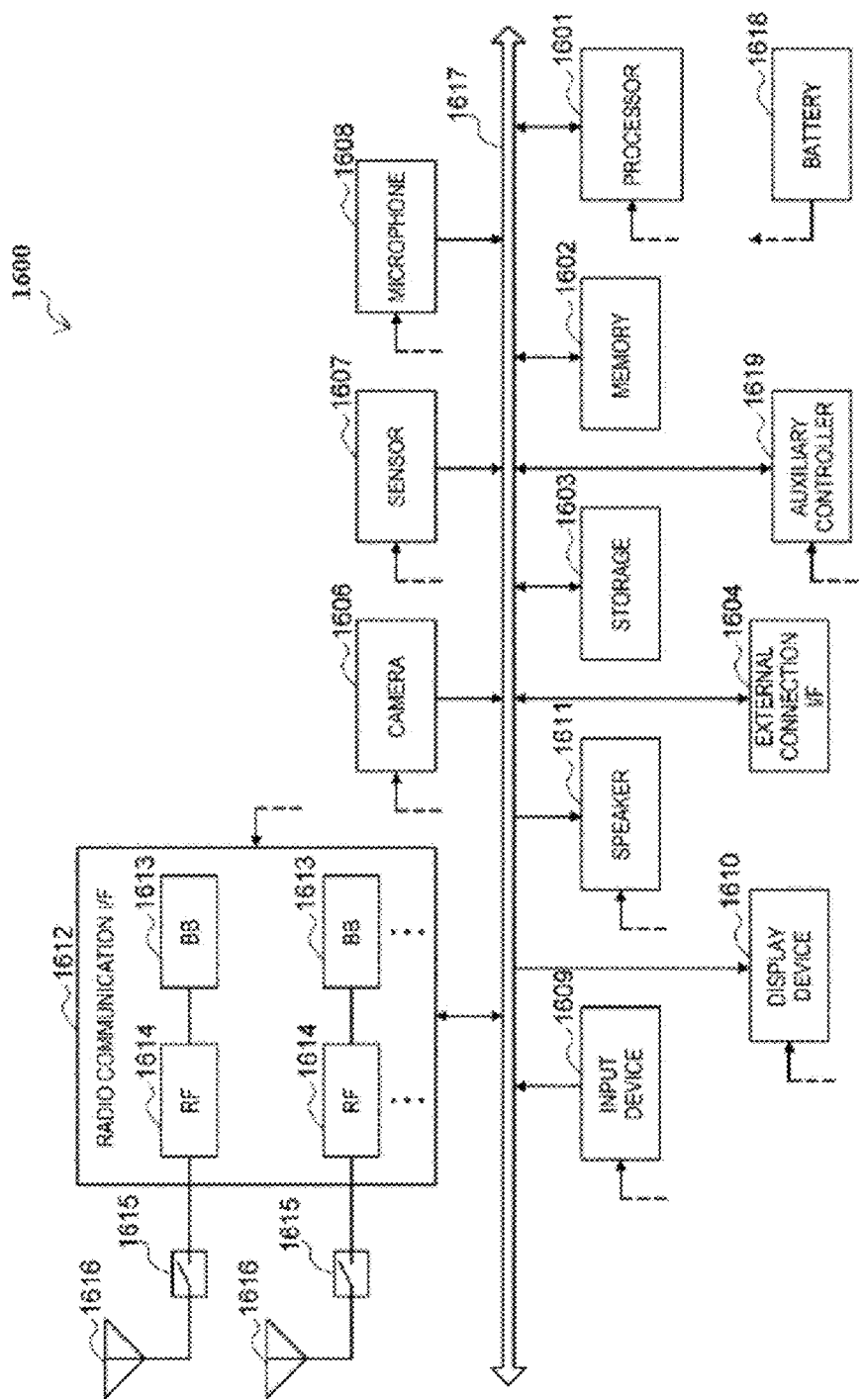
FIG. 16 is a block diagram illustrating an example of a schematic configuration of a smartphone to which the technology of the present disclosure can be applied.

FIG. 16 is a block diagram illustrating an example of a schematic configuration of a smartphone to which the technology of the present disclosure can be applied. A smartphone 1600 includes a processor 1601, a memory 1602, a storage device 1603, an external connection interface 1604, a camera device 1606, a sensor 1607, a microphone 1608, an input device 1609, a display device 1610, a speaker 1611, a radio communication interface 1612, one or more antenna switches 1615, one or more antennas 1616, a bus 1617, a battery 1618, and an auxiliary controller 1619. In an implementation, the smartphone 1600 (or the processor 1601) herein may correspond to the above-described terminal device 300B and/or 1500A.

The processor 1601 may be, for example, a CPU or a system on a chip (SoC), and controls functions of the application layer and other layers of the smartphone 1600. The memory 1602 includes a RAM and a ROM, and stores a program that is executed by the processor 1601. The storage device 1603 may include a storage medium such as a semiconductor memory and a hard disk. The external connection interface 1604 is an interface for connecting an external device (for example, a memory card and a Universal Serial Bus (USB) device) to the smartphone 1600.

The camera device 1606 includes an image sensor (for example, a charge coupled device (CCD) and a complementary metal oxide semiconductor (CMOS)), and generates a captured image. The sensor 1607 may include a set of sensors, such as a measurement sensor, a gyro sensor, a geomagnetic sensor, and an acceleration sensor. The microphone 1608 converts the sound input of the smart phone 1600 into an audio signal. The input device 1609 includes, for example, a touch sensor configured to detect touches on the screen of the display device 1610, a keypad, a keyboard, buttons, or switches, and receives input operations or information of a user. The display device 1610 includes a screen (for example, a liquid crystal display (LCD) and an organic light emitting diode (OLED) display), and displays output images of the smartphone 1600. The speaker 1611 converts output audio signals of the smartphone 1600 into sound.

The radio communication interface 1612 supports any cellular communication scheme (such as LTE, LTE-Advanced, and NR) and performs radio communication. The radio communication interface 1612 may typically include, for example, a BB processor 1613 and an RF circuit 1614. The BB processor 1613 may perform, for example, encoding/decoding, modulation/demodulation, and multiplexing/demultiplexing, and performs various types of signal processing for radio communication. In addition, the RF circuit 1614 may include, for example, a mixer, a filter, and an amplifier, and transmits and receives radio signals via the antenna 1616. The radio communication interface 1612 may be a chip module on which the BB processor 1613 and the RF circuit 1614 are integrated. As shown in FIG. 16, the radio communication interface 1612 may include multiple BB processors 1613 and multiple RF circuits 1614. Although FIG. 16 illustrates an example in which the radio communication interface 1612 includes multiple BB processors 1613 and multiple RF circuits 1614, the radio communication interface 1612 may alternatively include a single BB processor 1613 or a single RF circuit 1614.

In addition to a cellular communication scheme, the radio communication interface 1612 can support other types of radio communication schemes, such as a short-range wireless communication scheme, a near-field communication scheme, and a wireless local area network (LAN) scheme. In this case, the radio communication interface 1612 may include the BB processor 1613 and the RF circuit 1614 as to each radio communication scheme.

Each of the antenna switches 1615 switches the connection destination of the antenna 1616 among multiple circuits (for example, circuits for different radio communication schemes) included in the radio communication interface 1612.

Each of the antennas 1616 includes one or more antenna elements (such as multiple antenna elements included in a MIMO antenna), and is used for the radio communication interface 1612 to transmit and receive radio signals. As shown in FIG. 16, the smartphone 1600 may include multiple antennas 1616. Although FIG. 16 illustrates an example in which the smartphone 1600 includes multiple RF circuits 1616, the radio communication interface 1600 may alternatively include a single RF circuit 1616.

In addition, the smartphone 1600 may include the antennas 1616 for every radio communication scheme. In this case, the antenna switch 1615 can be removed from configuration of the smartphone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the radio communication interface 1612, and the auxiliary controller 1619. The battery 1618 provides power for various blocks of the smartphone 1600 illustrated in FIG. 16 via feeders, and the feeders are partially expressed as dashed lines in the figure. The auxiliary controller 1619, for example, operates the minimum necessary functions of the smartphone 1600 in sleep mode.

Second Use Case

Figure 17:
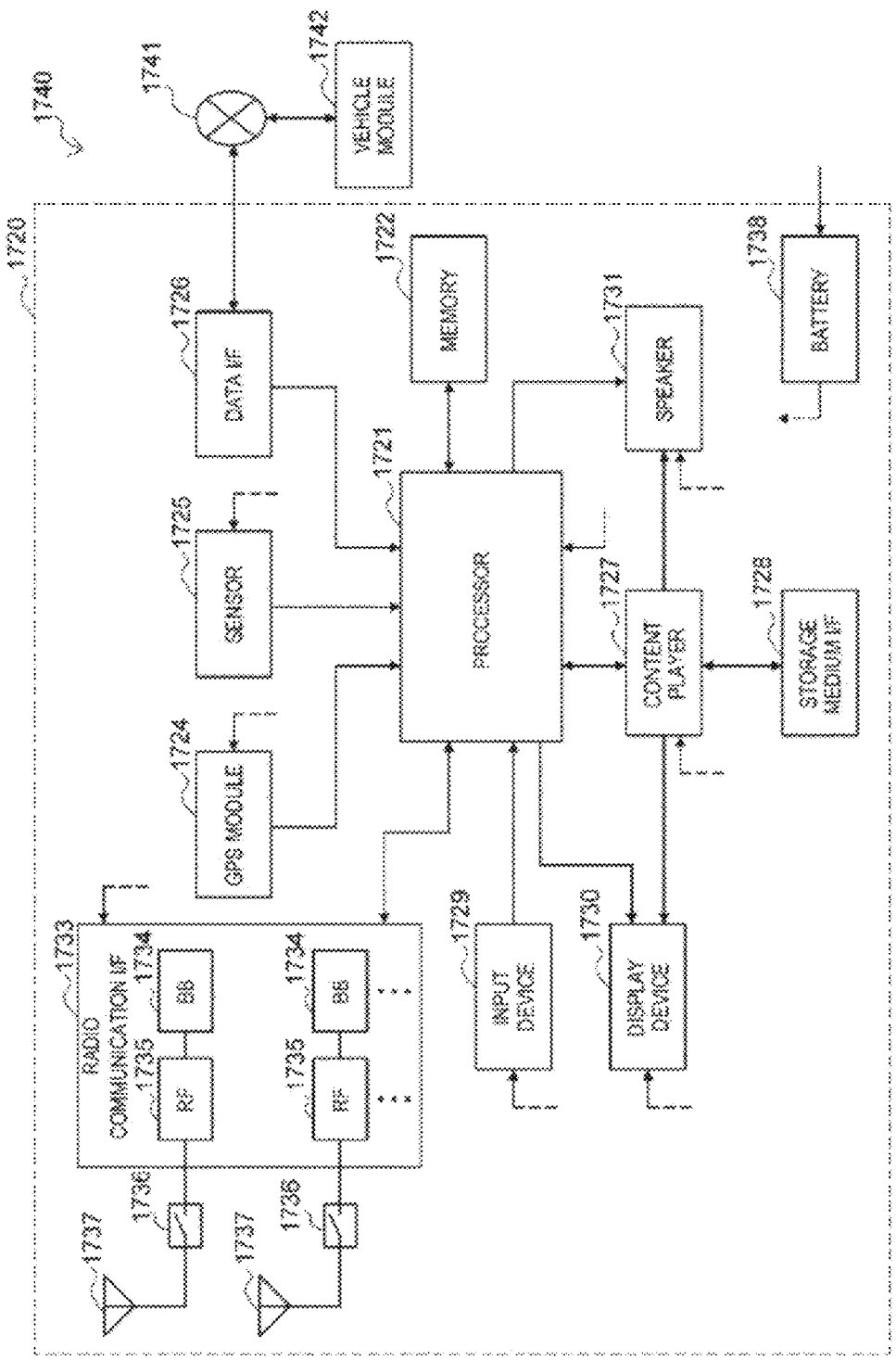
FIG. 17 is a block diagram illustrating an example of a schematic configuration of a car navigation device to which the technology of the present disclosure can be applied.

FIG. 17 is a block diagram illustrating an example of a schematic configuration of a car navigation device to which the technology of the present disclosure can be applied. A car navigation device 1720 includes a processor 1721, a memory 1722, a global positioning system (GPS) 1724, a sensor 1725, a data interface 1726, a content player 1727, a storage medium interface 1728, an input device 1729, a display device 1730, a speaker 1731, a radio communication interface 1733, one or more antenna switches 1736, one or more antennas 1737, and a battery 1738. In an implementation, the car navigation device 1720 (or the processor 1721) herein may correspond to the above-described terminal device 300B and/or 1500A.

The processor 1721 may be, for example, a CPU or a SoC, and controls the navigation function and other functions of the car navigation device 1720. The memory 1722 includes a RAM and a ROM, and stores a program that is executed by the processor 1721.

The GPS module 1724 performs measurement on a location (such as a latitude, a longitude, and an altitude) of the car navigation device 1720 by using GPS signals received from GPS satellites. The sensor 1725 may include a set of sensors, such as a gyro sensor, a geomagnetic sensor, and an air pressure sensor. The data interface 1726 is connected to, for example, an in-vehicle network 1741 via a terminal not shown, and acquires data generated by the vehicle (such as vehicle speed data).

The content player 1727 plays back content stored in a storage medium (such as a CD and a DVD), which is inserted into the storage medium interface 1728. The input device 1729 includes, for example, a touch sensor configured to detect touches on the screen of the display device 1730, buttons, or switches, and receives input operations or information of a user. The display device 1730 includes a screen, for example, an LCD or OLED screen, and displays images for the navigation function or playback content. The speaker 1731 outputs the sound for the navigation function or playback content.

The radio communication interface 1733 supports any cellular communication scheme (such as LTE, LTE-Advanced, and NR) and performs radio communication. The radio communication interface 1733 may typically include, for example, a BB processor 1734 and an RF circuit 1735. The BB processor 1734 may perform, for example, encoding/decoding, modulation/demodulation, and multiplexing/demultiplexing, and performs various types of signal processing for radio communication. In addition, the RF circuit 1735 may include, for example, a mixer, a filter, and an amplifier, and transmits and receives radio signals via the antenna 1737. The radio communication interface 1733 may further be a chip module on which the BB processor 1734 and the RF circuit 1735 are integrated. As shown in FIG. 17, the radio communication interface 1733 may include multiple BB processors 1734 and multiple RF circuits 1735. Although FIG. 17 illustrates an example in which the radio communication interface 1733 includes multiple BB processors 1734 and multiple RF circuits 1735, the radio communication interface 1733 may alternatively include a single BB processor 1734 or a single RF circuit 1735.

In addition to a cellular communication scheme, the radio communication interface 1733 can support other types of radio communication schemes, such as a short-range wireless communication scheme, a near-field communication scheme, and a wireless LAN scheme. In this case, the radio communication interface 1733 may include the BB processor 1734 and the RF circuit 1735 as to each radio communication scheme.

Each of the antenna switches 1736 switches the connection destination of the antenna 1737 among multiple circuits (for example, circuits for different radio communication schemes) included in the radio communication interface 1733.

Each of the antennas 1737 includes one or more antenna elements (such as multiple antenna elements included in a MIMO antenna), and is used for the radio communication interface 1733 to transmit and receive radio signals. As shown in FIG. 17, the car navigation device 1720 may include multiple antennas 1737. Although FIG. 17 illustrates an example in which the car navigation device 1720 includes multiple antennas 1737, the car navigation device 1720 may alternatively include a single antenna 1737.

In addition, the car navigation device 1720 may include the antennas 1737 for every radio communication scheme. In this case, the antenna switch 1736 can be removed from configuration of the car navigation device 1720.

The battery 1738 provides power for various blocks of the car navigation device 1720 illustrated in FIG. 17 via feeders, and the feeders are partially expressed as dashed lines in the figure. The battery 1738 accumulates power supplied by the vehicle.

The technology of the present disclosure may also be implemented as an in-vehicle system (or vehicle) 1740 including one or more blocks of the car navigation device 1720, the in-vehicle network 1741, and a vehicle module 1742. The vehicle module 1742 generates vehicle data (such as vehicle speed, engine speed, and failure information), and outputs the generated data to the in-vehicle network 1741.

The solution of the present disclosure may be implemented as shown in the example below.

1. An electronic device for a first transmission and reception point (TRP), where the first TRP and a second TRP jointly serve a particular terminal device, and the electronic device includes a processing circuit, where the processing circuit is configured to:

in response to that the first TRP and the second TRP are a master TRP and a secondary TRP respectively serving the terminal device:

provide measurement configuration information to the terminal device, where the measurement configuration information specifies at least the first TRP and the second TRP are to be measured;

receive a measurement report from the terminal device, where the measurement report comprises measurement qualities of at least the first TRP and the second TRP; and update TRP(s) serving the particular terminal device based at least on measurement qualities of the first TRP and the second TRP, where updating the TRP(s) serving the particular terminal device includes: determining that the second TRP is to become the master TRP serving the terminal device based on that a relative relationship between the measurement qualities of the first TRP and the second TRP meets a first threshold.

2. The electronic device according to clause 1, where updating the TRP(s) serving the particular terminal device further includes:

determining that a third TRP is to replace the second TRP to serve the terminal device based on that a measurement quality of the second TRP is lower than a second threshold and a measurement quality of the third TRP is better than the measurement quality of the second TRP.

3. The electronic device according to clause 1 or 2, where the processing circuit is further configured to send a corresponding TRP update request message to a base station based on updating the TRP(s) serving the particular terminal device, where the update request message contains one of the following:

the second TRP is to become the master TRP serving the terminal device; or the third TRP is to replace the second TRP and become the secondary TRP serving the terminal device.

4. The electronic device according to clause 3, where the processing circuit is further configured to receive a TRP update acknowledgment message from the base station, where the acknowledgment message indicates at least one of the following:

the second TRP is to become the master TRP serving the terminal device, and the first TRP is to become the secondary TRP serving the terminal device;

the third TRP is to replace the second TRP and become the secondary TRP to serve the terminal device; or the second TRP is to become the master TRP serving the terminal device, and the third TRP is to replace the first TRP and become the secondary TRP to serve the terminal device.

5. The electronic device according to clause 4, where the processing circuit is further configured to send a radio resource control (RRC) reconfiguration message to the terminal device, so as to instruct the terminal device to perform at least one of the following: establishing a master connection with the second TRP, and establishing a secondary connection with the first TRP;

establishing a secondary connection with the third TRP; or establishing a master connection with the second TRP, and establishing a secondary connection with the third TRP.

6. The electronic device according to clause 1, where the processing circuit is further configured to: in response to that the first TRP is the secondary TRP serving the terminal device, receive a TRP update control message from a base station and perform the following operations:

in response to the update control message indicating that the first TRP is to become the master TRP for the terminal device, preparing layer 2 resources, and sending a TRP update acknowledgment message to the base station; or in response to the update control message indicating that the first TRP no longer serves the terminal device, releasing a connection with the terminal device.

7. The electronic device according to clause 1, where the processing circuit is further configured to send control channel indication information to the terminal device, so as to instruct to receive a physical downlink control channel (PDCCH) via at least one of the first TRP or the second TRP.

8. The electronic device according to clause 7, where the processing circuit is further configured to carry the control channel indication information by a MAC control element.

9. The electronic device according to clause 1, where
the first TRP and a base station are implemented as a same device or separate devices;
the second TRP and the base station are implemented as separate devices or a same device; and/or
the first TRP and the second TRP are satellite communications devices.

10. An electronic device for a base station, where the base station controls multiple transmission and reception points (TRPs) to jointly serve a particular terminal device, and the electronic device includes a processing circuit, where the processing circuit is configured to:
in response to that a first TRP and a second TRP are a master TRP and a secondary TRP respectively serving the terminal device:
provide to the first TRP with measurement configuration information for the terminal device, where the measurement configuration information specifies that the terminal device performs measurements on at least the first TRP and the second TRP; and
receive a first update request message from the first TRP, where the first update request message indicates that the second TRP is to become the master TRP serving the terminal device and the first TRP is to become the secondary TRP serving the terminal device.

11. The electronic device according to clause 10, where the processing circuit is further configured to:
send a control message to the second TRP to indicate that the second TRP is to become the master TRP serving the terminal device.

12. The electronic device according to clause 10, where the processing circuit is further configured to:
receive a measurement report of the terminal device from the first TRP, where the measurement report comprises measurement qualities of respective TRPs; and
determine that a third TRP is to become the secondary TRP serving the terminal device based on that a measurement quality of the first TRP is lower than a third threshold and a measurement quality of the third TRP is better than the measurement quality of the first TRP.

13. The electronic device according to clause 12, where the processing circuit is further configured to:
send a control message to the first TRP to indicate that the first TRP no longer serves the terminal device;
send a control message to the second TRP to indicate that the second TRP is to become the master TRP serving the terminal device; and
send a control message to the third TRP to indicate that the third TRP is to become the secondary TRP serving the terminal device.

14. The electronic device according to clause 10, where the processing circuit is further configured to:
receive a second update request message from the first TRP, where the second update request message indicates that the third TRP is to replace the second TRP and become the secondary TRP serving the terminal device.

15. The electronic device according to clause 14, where the processing circuit is further configured to:
send a control message to the second TRP to indicate that the second TRP no longer serves the terminal device; and
send a control message to the third TRP to indicate that the third TRP is to become the secondary TRP serving the terminal device.

16. The electronic device according to clause 11, 13, or 15, where the processing circuit is further configured to:
send to the first TRP an acknowledgment message for the first or a second update request message.

17. The electronic device according to clause 10, where
the first TRP and the base station are implemented as a same device or separate devices;
the second TRP and the base station are implemented as separate devices or a same device; and/or
the base station is a satellite communications device.

18. An electronic device for a terminal device, where the terminal device is served by a first TRP and a second TRP jointly, the first TRP is a master TRP and the second TRP is a secondary TRP, and the electronic device includes a processing circuit, where the processing circuit is configured to:
measure the first TRP and the second TRP based on measurement configuration information received from the first TRP; and
send a measurement report to the first TRP based on that a relative relationship between measurement qualities of the first TRP and the second TRP meets a first threshold, where the measurement report comprises measurement qualities of at least the first TRP and the second TRP.

19. The electronic device according to clause 18, where the processing circuit is further configured to:
measure a third TRP based on the measurement configuration information, where the measurement report further comprises a measurement quality of the third TRP.

20. The electronic device according to clause 18 or 19, where the processing circuit is further configured to receive a radio resource control (RRC) reconfiguration message from the master TRP and perform at least one of the following:
establishing a master connection with the second TRP, and establishing a secondary connection with the first TRP;
establishing a secondary connection with the third TRP; or
establishing a master connection with the second TRP, and establishing a secondary connection with the third TRP.

21. The electronic device according to clause 18, where the processing circuit is further configured to receive control channel indication information from the first TRP, so as to receive a physical downlink control channel (PDCCH) via at least one of the first TRP or the second TRP.

22. The electronic device according to clause 21, where the processing circuit is further configured to carry the control channel indication information by a MAC control element.

23. A method for a first transmission and reception point (TRP), where the first TRP and a second TRP jointly serve a particular terminal device, and the method includes:
in response to that the first TRP and the second TRP are a master TRP and a secondary TRP respectively serving the terminal device:
providing measurement configuration information to the terminal device, where the measurement configuration information specifies at least the first TRP and the second TRP are to be measured;
receiving a measurement report from the terminal device, where the measurement report comprises measurement qualities of at least the first TRP and the second TRP; and
updating TRP(s) serving the particular terminal device based at least on measurement qualities of the first TRP and the second TRP,
where updating the TRP(s) serving the particular terminal device includes: determining that the second TRP is to become the master TRP serving the terminal device based on that a relative relationship between the measurement qualities of the first TRP and the second TRP meets a first threshold.

24. A method for a base station, where the base station controls multiple transmission and reception points (TRPs) to jointly serve a particular terminal device, and the method includes:
in response to that a first TRP and a second TRP are a master TRP and a secondary TRP respectively serving the terminal device:
providing to the first TRP with measurement configuration information for the terminal device, where the measurement configuration information specifies that the terminal device performs measurements on at least the first TRP and the second TRP; and
receiving a first update request message from the first TRP, where the first update request message indicates that the second TRP is to become the master TRP serving the terminal device and the first TRP is to become the secondary TRP serving the terminal device.

25. A method for a terminal device, where the terminal device is served by a first TRP and a second TRP jointly, and the first TRP is a master TRP and the second TRP is a secondary TRP, where the method includes:
measuring the first TRP and the second TRP based on measurement configuration information received from the first TRP; and
sending a measurement report to the first TRP based on that a relative relationship between measurement qualities of the first TRP and the second TRP meets a first threshold, where the measurement report comprises measurement qualities of at least the first TRP and the second TRP.

26. A computer-readable storage medium with one or more instructions stored therein, where the one or more instructions, when executed by one or more processing circuits of an electronic device, cause the electronic device to perform the method of any one of clauses 23 to 25.

27. An apparatus for wireless communication, including means for performing the method of any one of clauses 23 to 25.

The exemplary embodiments of the present disclosure have been described above with reference to the drawings, but the present disclosure is certainly not limited to the foregoing examples. Those skilled in the art can acquire various changes and modifications within the scope of the appended claims, and it should be understood that these changes and modifications will naturally fall within the technical scope of the present disclosure.

For example, multiple functions included in one unit in the foregoing embodiments may be implemented by separate apparatuses. Alternatively, the multiple functions implemented by the multiple units in the foregoing embodiments may be implemented by separate apparatuses respectively. In addition, one of the foregoing functions may be implemented by multiple units. Needless to say, such a configuration is included in the technical scope of the present disclosure.

In this specification, the steps described in the flowchart include not only processes performed sequentially in time order, but also processes performed in parallel or individually rather than necessarily in time order. In addition, even in the steps processed in time order, needless to say, the sequence can be changed appropriately.

Although the present disclosure and its advantages have been described in detail, it should be understood that various modifications, replacements, and changes can be made without departing from the spirit and scope of the present disclosure as defined by the appended claims. Moreover, terms "comprise", "include", or any other variations thereof are intended to cover non-exclusive inclusions, so that processes, methods, articles or devices containing a series of elements not only contain these elements, but also contain other elements which are not clearly listed, or further contain elements which are inherent to these processes, methods, articles or devices. Under the condition of no more limitations, an element defined by the statement "including . . . " does not exclude existence of the same other elements in a process, method, articles or device including the element.

The invention claimed is:

1. An electronic device for a base station, wherein the base station controls multiple transmission and reception points (TRPs) to jointly serve a particular terminal device, and the electronic device comprises a processing circuit, wherein the processing circuit is configured to:
in response to that a first TRP and a second TRP are a master TRP and a secondary TRP respectively serving the terminal device:
provide to the first TRP with measurement configuration information for the terminal device, wherein the measurement configuration information specifies that the terminal device performs measurements on at least the first TRP and the second TRP; and
receive a first update request message from the first TRP, wherein the first update request message indicates that the second TRP is to become the master TRP serving the terminal device and the first TRP is to become the secondary TRP serving the terminal device,
wherein the processing circuit is further configured to receive a second update request message from the first TRP, wherein the second update request message indicates that the third TRP is to replace the second TRP and become the secondary TRP serving the terminal device and
wherein:
the first TRP and the base station are implemented as a same device or separate devices;

the second TRP and the base station are implemented as separate devices or a same device; and/or the base station is a satellite communications device.

2. The electronic device according to claim 1, wherein the processing circuit is further configured to:

in response to the first update request message, send a control message to the second TRP to indicate that the second TRP is to become the master TRP serving the terminal device, wherein the processing circuit is further configured to send to the first TRP an acknowledgment message for the first update request message.

3. An electronic device for a base station, wherein the base station controls multiple transmission and reception points (TRPs) to jointly serve a particular terminal device, and the electronic device comprises a processing circuit, wherein the processing circuit is configured to:

in response to that a first TRP and a second TRP are a master TRP and a secondary TRP respectively serving the terminal device;

provide to the first TRP with measurement configuration information for the terminal device, wherein the measurement configuration information specifies that the terminal device performs measurements on at least the first TRP and the second TRP; and receive a first update request message from the first TRP, wherein the first update request message indicates that the second TRP is to become the master TRP serving the terminal device and the first TRP is to become the secondary TRP serving the terminal device, wherein the processing circuit is further configured to:

receive a measurement report of the terminal device from the first TRP, wherein the measurement report comprises measurement qualities of respective TRPs; and determine that a third TRP is to become the secondary TRP serving the terminal device based on that a measurement quality of the first TRP is lower than a third threshold and a measurement quality of the third TRP is better than the measurement quality of the first TRP, wherein the processing circuit is further configured to:

send a control message to the first TRP to indicate that the first TRP no longer serves the terminal device;

send a control message to the second TRP to indicate that the second TRP is to become the master TRP serving the terminal device; and send a control message to the third TRP to indicate that the third TRP is to become the secondary TRP serving the terminal device, wherein the processing circuit is further configured to send to the first TRP an acknowledgment message for the first update request message.

4. The electronic device according to claim 1, wherein the processing circuit is further configured to:

send a control message to the second TRP to indicate that the second TRP no longer serves the terminal device; and send a control message to the third TRP to indicate that the third TRP is to become the secondary TRP serving the terminal device, wherein the processing circuit is further configured to send to the first TRP an acknowledgment message for the second update request message.

5. A method for a base station, wherein the base station controls multiple transmission and reception points (TRPs) to jointly serve a particular terminal device, and the method comprises:

in response to that a first TRP and a second TRP are a master TRP and a secondary TRP respectively serving the terminal device;

providing to the first TRP with measurement configuration information for the terminal device, wherein the measurement configuration information specifies that the terminal device performs measurements on at least the first TRP and the second TRP; and receiving a first update request message from the first TRP, wherein the first update request message indicates that the second TRP is to become the master TRP serving the terminal device and the first TRP is to become the secondary TRP serving the terminal device, wherein the method further comprises receiving a second update request message from the first TRP, wherein the second update request message indicates that the third TRP is to replace the second TRP and become the secondary TRP serving the terminal device, and wherein:

the first TRP and the base station are implemented as a same device or separate devices;

the second TRP and the base station are implemented as separate devices or a same device; and/or the base station is a satellite communications device.

6. A method for a base station, wherein the base station controls multiple transmission and reception points (TRPs) to jointly serve a particular terminal device, and the method comprises:

in response to that a first TRP and a second TRP are a master TRP and a secondary TRP respectively serving the terminal device;

providing to the first TRP with measurement configuration information for the terminal device, wherein the measurement configuration information specifies that the terminal device performs measurements on at least the first TRP and the second TRP; and receiving a first update request message from the first TRP, wherein the first update request message indicates that the second TRP is to become the master TRP serving the terminal device and the first TRP is to become the secondary TRP serving the terminal device, wherein the method further comprises:

receiving a measurement report of the terminal device from the first TRP, wherein the measurement report comprises measurement qualities of respective TRPs; and determining that a third TRP is to become the secondary TRP serving the terminal device based on that a measurement quality of the first TRP is lower than a third threshold and a measurement quality of the third TRP is better than the measurement quality of the first TRP, wherein the method further comprises:

sending a control message to the first TRP to indicate that the first TRP no longer serves the terminal device;

sending a control message to the second TRP to indicate that the second TRP is to become the master TRP serving the terminal device; and sending a control message to the third TRP to indicate that the third TRP is to become the secondary TRP serving the terminal device, wherein the method further comprises sending to the first TRP an acknowledgment message for the first update request message.

7. A non-transitory computer product containing instructions for a method for a base station, wherein the base station controls multiple transmission and reception points (TRPs) to jointly serve a particular terminal device, and the method comprises:
in response to that a first TRP and a second TRP are a master TRP and a secondary TRP respectively serving the terminal device;
providing to the first TRP with measurement configuration information for the terminal device, wherein the measurement configuration information specifies that the terminal device performs measurements on at least the first TRP and the second TRP; and
receiving a first update request message from the first TRP, wherein the first update request message indicates that the second TRP is to become the master TRP serving the terminal device and the first TRP is to become the secondary TRP serving the terminal device,
wherein the method further comprises receiving a second update request message from the first TRP, wherein the second update request message indicates that the third TRP is to replace the second TRP and become the secondary TRP serving the terminal device, and
wherein:
the first TRP and the base station are implemented as a same device or separate devices;
the second TRP and the base station are implemented as separate devices or a same device; and/or
the base station is a satellite communications device.

8. A non-transitory computer product containing instructions for a method for a base station, wherein the base station controls multiple transmission and reception points (TRPs) to jointly serve a particular terminal device, and the method comprises:
in response to that a first TRP and a second TRP are a master TRP and a secondary TRP respectively serving the terminal device;
providing to the first TRP with measurement configuration information for the terminal device, wherein the measurement configuration information specifies that the terminal device performs measurements on at least the first TRP and the second TRP; and
receiving a first update request message from the first TRP,
wherein the first update request message indicates that the second TRP is to become the master TRP serving the terminal device and the first TRP is to become the secondary TRP serving the terminal device,
wherein the method further comprises:
receiving a measurement report of the terminal device from the first TRP, wherein the measurement report comprises measurement qualities of respective TRPs; and
determining that a third TRP is to become the secondary TRP serving the terminal device based on that a measurement quality of the first TRP is lower than a third threshold and a measurement quality of the third TRP is better than the measurement quality of the first TRP,
wherein the method further comprises:
sending a control message to the first TRP to indicate that the first TRP no longer serves the terminal device;
sending a control message to the second TRP to indicate that the second TRP is to become the master TRP serving the terminal device; and
sending a control message to the third TRP to indicate that the third TRP is to become the secondary TRP serving the terminal device,
wherein the method further comprises sending to the first TRP an acknowledgment message for the first update request message.

* * * * *